(12) United States Patent
Suzuki et al.

(10) Patent No.: US 7,646,193 B2
(45) Date of Patent: Jan. 12, 2010

(54) DEVICE INSPECTION DEVICE, DEVICE INSPECTION SYSTEM USING THE SAME, AND MOBILE TELEPHONE HOLDING DEVICE

(75) Inventors: Yoshio Suzuki, Tokyo (JP); Masako Watanabe, Tokyo (JP)

(73) Assignee: Japan Novel Corporation, Tokyo (JP)

( * ) Notice: Subject to any disclaimer, the term of this patent is extended or adjusted under 35 U.S.C. 154(b) by 294 days.

(21) Appl. No.: 10/555,458

(22) PCT Filed: Jan. 24, 2005

(86) PCT No.: PCT/JP2005/000838

§ 371 (c)(1),
(2), (4) Date: Apr. 12, 2007

(87) PCT Pub. No.: WO2005/071930

PCT Pub. Date: Aug. 4, 2005

(65) Prior Publication Data

US 2007/0205751 A1  Sep. 6, 2007

(30) Foreign Application Priority Data

Jan. 23, 2004  (JP)  ............................ 2004-015066
Jul. 6, 2004   (JP)  ............................ 2004-199348
Nov. 16, 2004  (JP)  ............................ 2004-332490

(51) Int. Cl.
*G01R 31/28*  (2006.01)

(52) U.S. Cl. .................................................. 324/158.1
(58) Field of Classification Search ................. 324/765, 324/158.1, 763; 382/149, 239, 240, 144, 382/209; 702/152; 257/48; 438/14–18; 348/373–376
See application file for complete search history.

(56) References Cited

U.S. PATENT DOCUMENTS 6,333,992 B1 * 12/2001 Yamamura et al. .......... 382/149
7,289,660 B2 * 10/2007 Miura et al. ................ 382/149

* cited by examiner

*Primary Examiner*—Ha Tran T Nguyen
*Assistant Examiner*—Tung X Nguyen
(74) *Attorney, Agent, or Firm*—Kubovcik & Kubovcik

(57) ABSTRACT

A device inspection apparatus that is capable of judging the functions of operating control buttons on a cellular phone or like device automatically and easily. The device inspection apparatus comprises an adapter unit 2 on which a cellular phone 1 is mounted; a camera 4 for picking up the image of an LCD panel 3, which serves as a display section for the cellular phone 1; a plunger unit 7, which has a plurality of releases 6 for pressing a key button 5 on the cellular phone 1; a computer 8 for controlling the operation of the plunger unit 7 and exercising control; and a monitor 9 for displaying an LCD panel image and an image based on a signal from the computer 8. A still picture, motion picture, or audio output, which is acquired when a release 6 presses a key button 5, is compared against a predetermined expected image or sound to judge the functionality of the cellular phone 1.

25 Claims, 41 Drawing Sheets

| Button | Registered Name |
|--------|-----------------|
| 1 | BTN1 |
| 2 | BTN2 |
| 3 | BTN3 |
| 4 | BTN4 |
| 5 | BTN5 |
| 6 | BTN6 |
| 7 | BTN7 |
| 8 | BTN8 |
| 9 | BTN9 |
| 0 | BTN0 |
| * | BTN* |
| # | BTN# |
| RIGHT | F_R |
| LEFT | F_L |
| UP | F_U |
| DOWN | F_D |
| ON | ON |
| OFF | OFF |
| ENTER | KETTEI |
| CLEAR | CLEAR |

Input Support Script

OK    CANCEL

Standard picture

Picture for comparison

Difference picture

Normal threshold value process

Judgment result

Previous Image

Current Image

Differential Image

DEVICE INSPECTION DEVICE, DEVICE INSPECTION SYSTEM USING THE SAME, AND MOBILE TELEPHONE HOLDING DEVICE

This application is a 371 of international application PCT/JP2005/000838, which claims priority based on Japanese patent application Nos. 2004-015066 filed Jan. 23, 2004, 2004-199348 filed Jul. 6, 2004, and 2004-332490 filed Nov. 16, 2004, which are incorporated herein by reference.

TECHNICAL FIELD

The present invention relates to an inspection apparatus and retainer for judging whether operating control buttons and cover open/close mechanism of a cellular phone or other device function as designed.

BACKGROUND ART

As is generally known, cellular phones, PHS phones, PDAs, game machines, notebook personal computers, and car navigation devices are provided with a large number of operating control buttons and wired or wireless input terminals. Users of these devices are supposed to operate the operating control buttons and input signals with the input terminals. In recent years, many folding type devices are released. These devices are constructed so that an LCD or other display section and an operating control section having operating control buttons and other controls are hinged together. The operating control buttons on a cellular phone or PHS phone, for instance, are used not only for dialing a phone number and entering characters, but also for setting up various telephone functions and computer functions.

The functions set up as described above include automatic lock, call cost display, use time display, ringtone setup, user information setup, and language setup functions. A wide variety of complicated functions can be set up for currently marketed cellular phones. This also holds true for the PDAs, game machines, notebook personal computers, and car navigation devices.

Further, the display sections on the PDAs and car navigation devices often use a touch panel. The above-mentioned functions can be exercised by operating not only hard operating control buttons but also on-screen soft operating control buttons. Unless otherwise stated, the term "operating control buttons" hereinafter refers to not only hard operating control buttons but also on-screen soft operating control buttons.

DISCLOSURE OF INVENTION

Problems to be Solved by the Invention

Under the above circumstances, manufacturers of cellular phones, PDAs, and other devices need to judge, prior to shipment, whether the operating control buttons properly work to perform setup and other functions. The manufacturers of cellular phones and other devices have performed such an outgoing judgment/verification procedure in a virtually manual manner. The outgoing judgment/verification procedure needs to be improved because it is considerably bothersome.

The present invention has been made in view of the above circumstances. It is an object of the present invention to provide an inspection apparatus for checking automatically and easily whether operating control buttons on cellular phones and other devices can perform various setup operations as designed.

Means for Solving the Problems

In one aspect of the present invention, a device inspection apparatus for inspecting the operation of an inspection target device that changes its internal state in accordance with an external input, including an object-contact-based input, audio input, wired signal input, wireless signal input, infrared signal input, and image signal input, and operates built-in output means to transmit an external output, including video and audio, in accordance with a change in the internal state comprises inspection item output means for generating an output in response to the external input and delivering the generated output to the inspection target device, detection means for detecting an output from output means of the inspection target device outside the inspection target device, and scenario setup means for specifying the procedure for operating the inspection item output means. The inspection item output means operates in accordance with the procedure specified by the scenario setup means to selectively input an external input for the purpose of checking whether the output of the inspection target device, which is detected by the detection means, agrees with an expected value that is predicted from the internal state of the inspection target device and the external input.

In another aspect of the present invention, the inspection item output means of the device inspection apparatus includes a robot that has a predetermined degree of freedom in operating a plurality of switches and controls.

In another aspect of the present invention, the inspection item output means of the device inspection apparatus is such that the inspection target device includes audio input means, video signal input means, wired signal input means, or radio, infrared, or electromagnetic wireless input means.

In another aspect of the present invention, a device inspection apparatus for inspecting the operation of an inspection target device that includes an operating control section, which has a plurality of operating control buttons, and a display section whose on-screen contents vary in accordance with the operation of at least one of the operating control buttons comprises image pickup means for picking up an image of the display section, an adapter for placing the inspection target device in a predetermined state in relation to the image pick means, button control means including a plurality of press means that are capable of pressing one of the operating control buttons, control means for selecting the button control means and exercising operating control, and display means for displaying an image acquired by the image pickup means and an image based on a signal supply from the control means. The control means includes means for displaying a previously obtained overall image of the inspection target device on the display means, button assignment means for defining the relationship between operating control images within the overall image displayed by the display means and a plurality of press means of the button control means, means for displaying an image of the display section, which is obtained by the image pickup means, at a display section position of the displayed overall image, and scenario setup means for specifying the procedure for operating the press means, and can check for agreement between the contents displayed by a display on the inspection target device and an image displayed by the display section by operating the press means according to the procedure specified by the scenario setup means to selectively operate the plurality of press means.

In another aspect of the present invention, the adapter incorporates a microphone for collecting a sound that is emitted by the inspection target device.

In another aspect of the present invention, the adapter incorporates a speaker for generating an amplified output of a sound that is emitted by the inspection target device.

In another aspect of the present invention, the adapter covers at least an upper surface of the operating control section of the inspection target device and includes a guide plate, which has at least the same number of guide holes as that of required operating control buttons to position the press means in alignment with the required operating control buttons.

In another aspect of the present invention, the inspection target device is a folding type, open/close device that includes the display section and operating control section, which are hinged together, and an operating control button for opening. The operating control means includes press means for operating the operating control button for opening.

Another aspect of the present invention includes image judgment means for comparing an image displayed on the display of the inspection target device, which is picked up by the image pickup means, against an image displayed on the display section, and generating information for indicating the agreement between the compared images. In another aspect of the present invention, the image judgment means judges either still pictures or motion pictures.

In another aspect of the present invention, the image judgment means is provided with a process for calibrating the image pickup means.

In another aspect of the present invention, the image judgment means compares a shot image against a reference image, extracts an area representing a difference between the compared images, and judges a display error location.

In another aspect of the present invention, the image judgment means corrects a judgment target image by enhancing its contrast and handles the corrected image as the judgment target image.

Another aspect of the present invention sets an image acquisition frame as a judgment target.

In another aspect of the present invention, the image judgment means extracts a highly bright portion of a judgment target and handles the extracted portion as the judgment target.

In another aspect of the present invention, the image judgment means extracts a difference as a brightness difference and judges an error location in accordance with the magnitude and size of the difference.

In another aspect of the present invention, the image judgment means stores a motion picture acquired by the image pickup means in storage means as a plurality of still pictures and compares the stored images against an expected value, which serves as a judgment criterion, with timing adjusted.

In another aspect of the present invention, the image judgment means selects a particular still picture from a plurality of acquired still pictures, determines an average value of the selected still picture and a still picture close to the selected still picture in time, and handles the average value as a judgment target image.

In another aspect of the present invention, the image judgment means performs a process for creating a plurality of color-specific image data, which are obtained by separating a judgment target image into various colors, and gray data including brightness data only, determining difference values within the color-specific image data, creating an overall gray value from the difference values, extracting a great change in the overall gray value as a great-change area, and determining the center of gravity of the great-change area.

In another aspect of the present invention, the image judgment means creates an overall gray value from the difference values and extracts a great change in the overall gray value as a great change area.

In another aspect of the present invention, the image judgment means performs a process for determining a movement area difference.

Another aspect of the present invention formulates a judgment in accordance with an image absolute value.

In another aspect of the present invention, a device inspection apparatus formulates a final judgment in accordance with the above plurality of results.

Another aspect of the present invention includes sound judgment means, which compares a sound that is generated by a target device and acquired by the microphone against a sound that should be generated by the target device, and outputs information indicating whether the two sounds agree with each other.

In another aspect of the present invention, the sound judgment means judges a DTMF sound.

In another aspect of the present invention, the sound judgment means judges an RT/RBT sound.

In another aspect of the present invention, the sound judgment means formulates a judgment by measuring the frequency of a microphone-input sound having a high level.

In another aspect of the present invention, the sound judgment means makes a frequency analysis and formulates a judgment in accordance with the result of the frequency analysis.

In another aspect of the present invention, the sound judgment means judges musical sound data that is generated by a target device.

Another aspect of the present invention detects a no-sound interval and recognizes the detected interval as a starting point for sound judgment.

In another aspect of the present invention, a device inspection system comprises a plurality of units of the device inspection apparatus, which are connected via a network to establish electronic communication. One unit of the device inspection apparatus operates as a server whereas the other units of the device inspection apparatus operate as clients. The control means of the server includes means for controlling the clients.

In another aspect of the present invention, a cellular phone retainer retains a cellular phone with a plurality of movable or immovable support members, and uses a detachable rubber string or other elastic member to provide an enhanced holding capability and a capacity for holding various cellular phones that differ, for instance, in size.

In another aspect of the present invention, the plurality of support members include a pair of immovable guide support members, at least one parent slider that can slide in the axial direction of the guide support members, a child slider that is amounted on the parent slider and capable of sliding in the axial direction of the guide support members, and an immovable retention support member that is positioned between the guide support members and parallel to the parent slider.

Another aspect of the present invention is configured so that the parent slider supports a bottom surface of the cellular phone, and that the child slider supports a lateral surface of the cellular phone, and further that the retention support member provides an enhanced capability for holding the cellular phone.

Another aspect of the present invention includes an elastic member for applying tension to position the child slider at the center between the guide support members.

EFFECT OF THE INVENTION

The device inspection apparatus according to the present invention, which inspects cellular phones and like devices, and the device inspection system based on the device inspection apparatus are as described above. Therefore, the present invention makes it possible to judge automatically and easily whether various setup operations invoked by the operating control buttons and other external input controls on a cellular phone, PHS phone, and like device, and still picture, motion picture, and audio output operations are as designed.

The cellular phone retainer according to the present invention is capable of holding various cellular phones that differ, for instance, in size.

The cellular phone retainer according to the present invention is capable of holding not only cellular phones but also PDAs and like devices that differ, for instance, in size.

BEST MODE FOR CARRYING OUT THE INVENTION

Embodiments of the present invention will now be described with reference to the accompanying drawings. The following description deals only with cases where a cellular phone is handled as an inspection target device. However, the present invention can also be applied to the above-mentioned PDAs and like devices. Therefore, explanations about such devices are omitted.

The device to be inspected by the embodiments is a device including output means that changes its internal state in accordance with an external input, including an object-contact-based input such as a button press, operating control rotation, and touch panel contact/drawing input, audio input, camera input or other image signal input, wired signal input from a connector, and radio or infrared wireless signal input, and generates an external output including video and audio.

The following description assumes that button operation means, which has a plurality of press means that are capable of pressing one of a plurality of operating control buttons, is used as inspection item output means for delivering an output to the above device as a response to the above-mentioned external input. However, a robot having an appropriate degree of freedom (e.g., 3-axis or 6-axis robot) may be used to sequentially press a plurality of buttons. Buttons and other operating controls that are arranged three-dimensionally can be accurately operated particularly when a multi-axis robot is used.

Further, it is assumed that the inspection item output means generates an output in response to an inspection target device's external input, including an operating control rotation input, touch panel contact/drawing input, audio input, camera input or other image signal input, wired signal input from a connector, and radio or infrared wireless signal input.

First Embodiment

FIG. 1 is a cross-sectional side view that conceptually illustrates one embodiment of a device inspection apparatus according to the present invention. The apparatus according to the present embodiment comprises an adapter unit 2, which constitutes an adapter for setting an inspection target cellular phone 1 in a predefined state; a camera 4 for picking up the image of an LCD panel 3, which serves as a display section for the cellular phone 1; a plunger unit 7, which has a plurality of releases 6, as press means, for pressing an operating control button (hereinafter may be referred to as a key button) on the cellular phone 1; a computer 8 for controlling the operation of the plunger unit 7 and exercising control, for instance, for judging the contents of the LCD panel 3 in relation to the control over the operation of the plunger unit 7; and a monitor 9, which serves as means for displaying an LCD panel image picked up by the camera 4 and an image based on a signal from the computer 8. The hardware for the computer 8 comprises a video capture board, an input/output board, a sound board, and an Ethernet® board or the like. The software for the computer 8 comprises cellular phone automatic evaluation system software and operating system software. It is preferred that the software for the computer 8 include text editor, word processor, database, and like software as needed. The employed system configuration may include, for instance, a keyboard, a mouse, a network terminal (for end-to-end testing), and a printer.

The cellular phone 1 shown in FIG. 1 is of folding type. It comprises a display section 11, which includes the LCD panel 3, and an operating control section 12, which includes key buttons 5. However, the inspection target is not limited to this type of cellular phone. For example, a straight type, flip type, or any other cellular phone can be inspected as far as the display section 11 and operating control section 12 are accessible from the outside. The present invention is applicable not only to cellular phones 1 but also to PHS phones, PDAs, game machines, notebook personal computers, car navigation devices, and various other devices as far as they are provided with operating control buttons that are to be operated.

FIG. 2 is a perspective view illustrating the cellular phone 1, which is mounted on the adapter unit 2. The adapter unit 2 comprises a base plate 21, an inclined plate 22, a release guide panel 23, and a pair of side plates 24. The base plate 21 is used to position the surface of the LCD panel 3 of the folding type cellular phone 1 perpendicularly to the optical axis of the camera 4. The inclined plate 22 can set the operating control section 12 of the cellular phone 1, which is at a predetermined angle from the optical axis of the camera 4 while the surface of the LCD panel 3 of the cellular phone 1 is perpendicular to the optical axis of the camera 4. The release guide panel 23 is set parallel or virtually parallel to the inclined plate 22 while the operating control section 12 of the cellular phone 1 is sandwiched between the release guide panel 23 and inclined plate 22. The side plates 24 support the above-mentioned plates and panel. For a straight type, flip type, or other similar cellular phone, there is no need to separate it into the base plate 21 and inclined plate 22 and position the inclined plate 22 at a certain angle in most cases as indicated in the example in FIG. 2. Therefore, the configuration employed for the adapter unit 2 for a straight type, flip type, or other similar cellular phone is not limited to the one shown in FIG. 2. There is no problem as far as the adapter unit 2 for a straight type, flip type, or other similar cellular phone matches the shape and construction of the target device. The release guide panel 23 is positioned so that it can be inserted between the side plates and removed from them. In accordance, for instance, with the number of operating control section key buttons 5 on the cellular phone 1 to be evaluated, the release guide panel 23 has holes 25 for the insertion of the releases 6 and can be replaced as needed to match the target device. Further, the release guide panel 23 is provided with a hole (not shown) that is positioned to match a microphone (not shown) on the cellular phone 1. A speaker 26 can be mounted in the hole.

FIG. 3 is a side view illustrating a base unit 30 on which the camera 4 or like device is mounted. The base unit 30 comprises a base plate 31 and a tower section 33. The tower section 33 carries the camera 4 and a microphone 32. The base plate 31 is provided with pins (not shown) and the like so that the adapter unit 2 can be properly positioned. The camera 4 is mounted on the tower section 33 in such a manner that the camera 4 can move up and down with its optical axis directed perpendicularly downward. The tower section 33 also carries the microphone 35, which is positioned to match a speaker 13 on the cellular phone 1. The optical axis of the camera 4 may be directed in a direction other than the perpendicularly downward direction. In such an instance, the adapter unit 2 and the like should be repositioned and reconfigured in accordance with the direction in which the optical axis of the camera 4 is directed. Although a mechanism for varying the position of the camera 4 is provided, it is not described herein.

The plunger unit 7 has a plurality of releases 6. More specifically, the number of releases 6 is larger than the number of key buttons 5 on the cellular phone 1 to be evaluated. The plunger unit 7 is capable of selectively driving the releases 6. The drive employed by the plunger unit 7 is not described herein because it is publicly known. As indicated in FIG. 4, the releases 6 are of a release wire type. Each release 6 comprises a tube 61 and a pin 62 that is threaded through the tube 61. To ensure that the release guide panel 23 can be mounted in and removed from the holes 25 with ease, a screw thread 64 is provided on only the base of a metal pipe section 63 at the end of the tube 61 and not on the whole length. The base is provided with a lock screw 65 and an adjustment screw 66 so that the protrusion length of the pin 62 can be adjusted. When this type of a release is used, a key button 5 is properly reached when the protrusion length of the pin 62 is sufficient. However, the greater the protrusion length, the weaker the pressing force.

Individual units, camera and other component wiring, drive system, signal transmission system, and the like are not shown in the figure or described herein.

The apparatus according to the present invention presses a key button 5 on the cellular phone 1, which is mounted on the adapter unit 2, by driving a desired release 6 of the plunger unit 7 in relation to the key button 5, uses the camera 4 to pick up an image of the LCD panel 3 whose contents change at the press of the key button 5, and judges, for instance, whether an image designated at a design/manufacture stage appears on the LCD panel 3 when the desired key button 5 is pressed.

FIG. 5 shows the contents of a main screen that appears on the monitor 9. The displayed image is obtained by combining an image 3a of the LCD panel 3, which is picked up by the camera 4, with an overall plan view image 1a of the cellular phone 1 to be judged/inspected, which has been picked up, for instance, with a digital camera.

The flow of an evaluation that is to be made with the apparatus according to the present embodiment will now be described. The evaluation is made by (1) creating a model file (button setup and LCD screen adjustment), (2) creating a scenario (preparing a design description and specification (expected value image and test items) to create a scenario) and debugging, (3) making the first evaluation (execution, manual judgment, and image changeover), and (4) making the second and subsequent evaluations (execution and automatic judgment). The evaluation procedure to be performed with the apparatus according to the present embodiment will be described below in detail.

First of all, model file creation will be described.

The evaluation is started by making a new model file and setting the information about the cellular phone 1. The model file is a file in which the information specific to the cellular phone 1 is written. The model file includes the information about image adjustments and the relationship between cellular phone key buttons 5 and releases 6.

More specifically, a prepared image file of the cellular phone targeted for evaluation is used to display an overall image of the cellular phone 1 on the monitor screen in such a manner that the display section 11 and operating control section 21 are visible, and create a screen corresponding to the LCD panel 3, which is to be combined with the overall image. As the image file, for example, a bitmap file should be prepared so as not to exceed the size of the main screen. Further, key buttons 5 necessary for judgment are set, and the releases 6 are assigned. The key buttons 5 are set one by one. More specifically, the key buttons 5 are enclosed to define the area from the main screen as indicated in FIG. 6 and specify names and plunger unit release numbers for all the enclosed key buttons 5. FIG. 7 shows a cellular phone information setup screen. FIG. 8 shows a button information setup screen. FIG. 9 shows a button information list screen. FIG. 10 shows a release number input example for key button information setup.

The plunger unit 7 is actually operated to check whether a release 6, which relates to a certain key button 5, operates when the key button 5 created on the main screen is clicked. When, for instance, the key button 5, which is created by operating the main screen, is clicked, the associated key button area turns blue to check whether the associated plunger unit release presses the key button on the cellular phone. Operational checkout can also be performed from the previously mentioned model file editing screen.

FIG. 11 shows a screen for returning the cellular phone from a special operating procedure setup mode to a standby screen (reset), turning off the cellular phone power and then back on (forced reset), and defining an open/close button for a folding type cellular phone. The folding type cellular phone open/close function is available only when the cellular phone 1 is of folding type, the adapter unit and plunger unit support a folding type cellular phone, and a release 6 can press an operating control button of an open/close mechanism, which is based, for instance, on a magnet. This ensures that the cellular phone 1 can be inspected/evaluated without being opened/closed (while the cellular phone 1 is open in the case of the embodiment shown in the figure).

The model file that is set up as described above is assigned an appropriate name and stored on a storage medium that is built in the computer 8 and provided as external means. The stored model file, that is, the created model file, can be modified. FIG. 12 shows a model file editing screen.

FIG. 13 shows a screen for adjusting the LCD panel screen that appears on the monitor 9. Image adjustments are made as needed by acquiring distortion correction data, correcting an image in accordance with the distortion correction data, and fine-tuning the corrected image in order named. If necessary, the LCD screen size is also adjusted. FIG. 13 also shows an LCD frame setup area and an LCD offset setup area. After the LCD screen is completely adjusted from the adjustment screen, the image is corrected as needed. Further, the corrected image is subjected to trapezoidal correction. FIG. 14 shows a screen for confirming the corrected image. This screen can also be used to correct the image color tone and brightness. Further, the corrected image can fine tuned by subjecting it to trapezoidal correction. The LCD screen size and inclination are fine tuned in accordance with a reference image.

Trapezoidal correction is accomplished by determining parameters for camera focal distance, degree of distortion, and the like with reference to a calibration sheet 40, which is shown in FIG. 15, and correcting the image by using the parameters as correction data. A correction value can be obtained by placing the calibration sheet 40 over the cellular phone 1, picking up the image of the calibration sheet 40 with the camera 4 so that the black frame and dots of a calibration sheet image displayed on the main screen are clearly visible, removing the calibration sheet 40, and picking up an image of the cellular phone LCD panel 3. FIG. 16 shows a degree-of-distortion acquisition wizard screen. Before degree-of-distortion acquisition, the measured height and width are first entered as the screen size of the LCD panel 3 on the cellular phone 1. A degree-of-distortion acquisition button is then pressed to start acquiring the degree of distortion. The result is finally displayed as a corrected image.

Scenario creation will now be described.

FIG. 17 shows a scenario creation editing screen. This screen comprises a scenario list box 50 and an information setup section 52. The scenario list box 50 is used for scenario display. The contents of the information setup section 52 can be changed by selecting a desired tab 51 (command setup tab or other tab).

For scenario creation, a key button operation command is first entered in the scenario list box 50. The information setup section 52 is then used to set key button press conditions. This information setup operation is performed to define a simultaneous multiple key press (a command for simultaneously pressing a plurality of key buttons 5), a duration of key button press (a period of time during which a cellular phone button is pressed), and a key button press interval (a time interval between the instant at which one command terminates and the instant at which the next process begins). An evaluation environment number radio button provides evaluation environment number setup and is used for end-to-end test setup. A folding section open/close area is used to set an open/close button press interval for a folding type cellular phone. This function is available only when the adapter unit for a folding type cellular phone and the plunger unit for opening/closing a folding type cellular phone are furnished. Further, a play command, control command, individual scenario call command, remote scenario call command (command for executing a scenario from a remote computer during end-to-end testing), wait command, repetition command, stop command, and judgment command are set. The judgment command acquires an image expected value, formulates a judgment on the spot (immediate judgment), and continues with or stops a scenario execution in accordance with the obtained judgment result. The acquired measured value is judged from a confirmation screen, which is described later. However, the use of the judgment command makes it possible to formulate a judgment on the spot, and if an expected judgment result is not obtained, the judgment command can interrupt the execution of a scenario. It is also possible to set up a scenario call command that can call a scenario within which another scenario is nested. FIG. 18 shows an example in which a plurality of scenarios are recalled.

FIG. 19 shows the contents of an expected value setup tab. A command can be entered from the screen shown in FIG. 19 to record a response of the cellular phone 1. An image of the LCD panel screen and a sound picked up from the microphone 35 can be recorded. In FIG. 19, the reference numeral 53 denotes an expected value image display space.

An image acquisition command is used to perform a test by setting an expected value image and comparing an actual image against the expected value image. A jpg, bmp, emf, or other similar file is set as an expected value image. The recording start timing is specified as the measured value recording timing. Further, an image is specified with a judgment range defined. Meanwhile, a sound acquisition command is used to record a sound that is collected by the microphone 35. It makes it possible to judge a sound (DTMF sound), which is generated at a press of a key button 5, from a confirmation screen.

An input support area, which is shown in FIG. 17, automatically generates a scenario for enabling the cellular phone 1 to enter hiragana characters, numerals, alphabetical characters, and symbols for use, for instance, as names and phone numbers. When a key button information button in this area is operated, a button correspondence table appears as shown in FIG. 20. This table can be used to define the relationship between the cellular phone key buttons 5, which are used to enter characters, and the key names registered in a model file.

Debugging is then performed to check whether a created scenario properly operates. A debugging screen is the same as an execution screen (FIG. 21), which is described later. The check result is output, for instance, as an error report as indicated in FIG. 22.

Scenario execution will now be described.

FIG. 21 shows an execution screen. This screen comprises a scenario list box 80, an execution time designation section 81, and an execution status display section 82. The execution status display section 82 comprises a scenario table list box 83, a current scenario box 84, an expected value image display section 85, and an execution LCD image display section 86. The scenario list box 80 displays the name of a scenario that is being executed or about to be executed. The execution time designation section 81 includes a section for displaying a setting about the key button press time, a section for displaying a setting about expected value recording timing, and a section for displaying a stop level. The scenario table list box 83 displays a selected scenario and a set of scenarios. The current scenario box 84 displays a scenario that is selected from the scenario table list box 83. When the image acquisition command is executed, the expected value image display section 85 displays an image that is defined as an expected value. The execution LCD image display section 86 displays a cellular phone LCD panel screen that is shot.

When two sets of the above cellular phone automatic evaluation system are used, it is possible to conduct an end-to-end test. In the end-to-end test, the connection to a remote system computer is established via a LAN, and the connected system automatically executes the same scenario. In other words, one of the two cellular phone automatic evaluation systems operates as a server while the remaining one operates as a client. The server controls the client during the test. When the server executes a scenario, the server operates the plunger unit 7 of the client so that two cellular phones are operated. It is therefore possible to call a second cellular phone 1 and allow the called second cellular phone to answer the call for testing purposes.

Automatic scenario execution is possible no matter whether the test is an end-to-end test. However, the scenario can be manually halted, stopped, and resumed. A step execution mode can be set so that the scenario can be executed step by step. A semiautomatic execution mode can also be set so that the scenario can be executed in an automatic execution mode in the middle of a scenario execution.

After a scenario is executed once for a certain cellular phone, a confirmation procedure is performed (manual judgment and image changeover). For example, a judgment is manually formulated. If a satisfactory judgment result is obtained, the image is changed. First of all, the image is checked, and then all the scenario steps are judged to determine whether the execution image agrees with the expected value image. When a plurality of scenarios are to be executed, all steps of all scenarios are judged. If the expected value image is not directly derived from a screen, it is changed because an image judgment cannot be formulated. After the expected value image is changed, the newly employed image is registered in the database as an expected value the next time the same scenario is executed. Therefore, automatic image judgment is possible. If only a part of a prepared expected value image is to be used for automatic judgment, the judgment area can be defined.

As the judgment area, a default judgment area and an individual judgment area can be set. When the former judgment area is set, the same judgment area applies to all images. When the latter judgment area is set, on the other hand, the judgment area applies to only the on-screen image that is handled for judgment area setup. It is also possible to define a judgment area and an exclusion area. A complicated shape can be judged by combining a judgment area and an exclusion area. Since the system is based on a computer, it possible to specify the coordinates of the judgment area.

The results of the second and subsequent scenario executions can be automatically judged as far as the expected value image is changed. The automatic judgment function automatically judges whether a predefined area of the measured image agrees with that of the expected value image. It is also possible to automatically judge whether the frequency of a measured DTMF sound agrees with that of the expected value DTMF sound.

Folding type cellular phones with an operating control section 12 having key buttons 5 and a second display panel on the outer surface of the operating control section are recently developed and made commercially available. PDAs and other devices having the same structure are also developed and made commercially available. Such a device can be inspected by evaluating the contents of the LCD panel 3 while the device is open and evaluating the display panel on the outer surface of the operating control section 12 while the device is closed or by simultaneously picking up the images of the two display panel screens of the device with two cameras while it is open and evaluating the obtained images.

A method for evaluating the contents of a screen will now be described. In the present embodiment, still pictures and motion picture are to be evaluated as indicated in FIG. 23. Further, the sound generated by a cellular phone or like device is to be judged as indicated in FIG. 24.

First of all, image evaluation will be outlined. In the present embodiment, step S101 is first performed as indicated in FIG. 23 to calibrate an image that is fed from the camera 4. This calibration is effected once for the entire system. The calibration is applicable to an image that is picked up by a camera for an inspection apparatus for another device, which constitutes the system.

Next, an operating control button 5 on the inspection target cellular phone 1 is pressed within each device inspection apparatus to display an image on the LCD panel 3 of the cellular phone 1 (step S102). The image is then picked up by the camera 4 and judged (still pictures and motion pictures are handled separately) (step S104).

In the present embodiment, a sound judgment is formulated by judging a DTMF sound, BT/RBT sound, and melody. This judgment is formulated by operating an operating control button 5 on the cellular phone 1 (step S201), acquiring a generated sound with the microphone 35 (step S202), storing a sound signal in the device inspection apparatus once, and judging the stored sound (step S203). First of all, image pickup device calibration about the device inspection apparatus will be described in detail.

For calibration purposes, the shot image is read to determine the coordinates of 7×7 black dots, which are displayed at the center of the calibration sheet shown in FIG. 15. Shooting characteristic data of the camera is then acquired by comparing the shot image dots against the actual calibration sheet.

First, a plurality of images of the calibration sheet are shot (e.g., 20 images). These shots are taken while the calibration sheet is variously positioned and angled. This ensures that the positional coordinates of the calibration sheet image dots are obtained under various conditions.

Next, an image of the calibration sheet that is positioned parallel to the LCD screen of the inspection target cellular phone is shot. The positional coordinates of the dots are acquired from all the calibration sheet images. The data obtained in this manner is used to calculate the camera focal distance, the radial distortion center position, and the degree of distortion. The calculations are performed by an image process library. The image process library is commercially available software (e.g., MVTec's HALCON®), which calculates the above-mentioned elements. Corrections are then made until the last calibration sheet image, which is placed over the cellular phone screen and shot, is no longer distorted.

Since the present embodiment shoots an image within the apparatus covering for the purpose of detecting the dot positions from the calibration sheet, a dark image is obtained. The image process library contains a function for acquiring a rectangle position of the sheet. This function makes it possible to acquire only a rectangle that is displayed by a line having a specified color.

A threshold value is passed to this function as an argument. However, if the threshold value is too great, detection is not accomplished when the image is dark. If, on the other hand, the threshold value is too small, a wrong area is acquired. A return value for the library does not indicate whether a rectangle is acquired. If the situation is allowed to continue when an unsuccessful result is obtained, an error may occur eventually. Therefore, it is necessary to acquire an accurate rectangular area at this stage.

To detect a mark even when the image is dark and irregular, therefore, a function for acquiring the same rectangle as above is executed while a great threshold value is gradually decreased. Function execution is stopped when the acquired area is closest to a square.

Next, a parameter for camera distortion correction is acquired from the calibration sheet images. The image process library is used to calculate the camera focal distance, the radial distortion center position, the degree of distortion, and the camera coordinates converted in accordance with the last calibration sheet image.

The cellular phone image is converted with the parameter that is acquired as described above. The above values are used to convert the last acquired calibration sheet and cellular phone LCD image. The calibration sheet is then displayed as an undistorted square.

Further, conversion is effected so that a properly sized square is displayed at the center. The purpose is to ensure that the cellular phone LCD screen is finally displayed at the center without being distorted instead of the calibration sheet. Therefore, conversion is repeatedly effected with a varying conversion parameter until a properly sized cellular phone LCD screen is displayed at the center.

Corrections are then made so that the image can be used with another device inspection apparatus in accordance with a reference image for another model. When the user selects one reference image and then clicks an automatic correction button, the current image is corrected so that its size and brightness agree with those of the reference image.

Automatic corrections are made in accordance with the reference image. An affine transformation is performed so that the position, rotation, enlargement/reduction, and aspect ratio agree with those of the reference image. This correction is made when a still picture is to be obtained from an image that is picked up by a camera.

Next, the camera brightness and contrast are adjusted in accordance with the reference image. If the still picture brightness is changed later and the image is too bright and indistinct, the accurate color value cannot be determined because the data retained by the original image ranges from 0 to 255. Therefore, the shot image is not to be converted. Instead, the camera settings are directly changed. Images are shot successively while varying the camera brightness and contrast, and then the shot images are compared to properly adjust the brightness and contrast.

Still picture comparison will now be described.

In an image process for the device inspection apparatus according to the present invention, the input image cannot be predicted. When an image is input, it is necessary to select an optimum judgment logic and formulate a correct judgment. More specifically, even when a fine image or dark image is input, it is necessary to adjust the brightness so as to facilitate judgment and judge the difference between areas having adequate sizes.

For example, a bright LCD area is acquired in a manner described below.

An image histogram (0 to 255) is obtained and roughly divided into three peaks as indicated in FIG. 29. A threshold value process is performed with a value that corresponds to a boundary between the darkest peak and the second darkest peak.

If there are even-numbered peaks, a threshold value process is performed with a value that corresponds to the center. In the present embodiment, the image is to be divided into a black frame and bright LCD area. There is no problem if the black frame is eliminated. However, a gray color may result due to light leakage. That is why the boundary between the darkest peak and the second darkest peak is used.

If a significant image brightness difference is encountered, a value in a setup file is used to determine whether the difference should be adjusted to obtain the same brightness or an NG condition should result due to brightness difference. The user can change the value in the setup file.

If the actual image brightness differs from the setting employed here, the images are compared without making a positional correction. Further, it is concluded that the images do not match.

To adjust the difference between the creation reference image and measured image, a template for adjusting the position with reference to the reference image is later subjected to a position correction process. A pattern matching template for such position adjustment is created on the basis of the reference image. An image for template creation (calculation with the image process library) is selected.

In the present embodiment, an image confined to an LCD area periphery (3 pixels wide) is used as a registered image. This ensures that the position can be corrected rapidly and accurately.

If the original image contrast is low, a correction is made to raise the contrast. This correction is not accomplished by making a simple gamma correction. As indicated in FIG. 28, the correction is made so as to increase the brightness of a portion that is brighter than the color average value and increase the darkness of a portion that is darker than the color average value. The image average value, maximum value, and minimum value are used to calculate a brightness enhancement conversion table and correct the contrast. This method is used to judge an image that is subtle in hue. When the contrast is raised in this manner, an inflection point is generated to define a region in which the brightness increases and another region in which the darkness increases.

Next, the measured image is subjected to color correction in accordance with the reference image. Adjustments are made excluding fine image patterns and edges so that the same color correction is provided for slightly different images. If the color average value of the measured image differs from that of the reference image by a threshold value (user-designated parameter), no correction is made. Further, a pattern matching procedure is performed with reference to a template that is created earlier. For pattern matching purposes, the image process library performs calculations.

When a judgment is to be repeatedly formulated, the first position information is used for the second and subsequent judgments to increase the judgment speed. The first reference image position data is retained. Such retained position data is read for the second and subsequent judgments and used for image matching to achieve position adjustment.

If a great displacement occurs as a result of position adjustment or if the resultant-move is greater than the user-specified move, the moved image is returned to the original location so that a judgment is formulated with the two images superposed one on the other.

A judgment is formulated while the measured image is superposed over the reference image. If the images significantly differ in color or position or otherwise produce an NG result, the image difference is generated as a result without correcting the position.

The image judgment area is converted in accordance with data that is derived from position adjustment. When position adjustment is successful, an affine transformation is performed in accordance with the data. This process is performed by the image process library. Further, the reference image and measured image are confined to the user-specified judgment target area for judgment purposes.

Next, the difference between the reference image and measured image is determined. In the present embodiment, the image difference is obtained by determining the R, G, B, and gray image differences between the reference image and measured image. If the original image contrast is low, the execution of a difference enhancement process is effective. This process is performed to add the obtained R, G, B, and gray difference images in order to provide increased clarity.

A threshold value process is performed on the difference image by using a threshold value between 70 or so (user-definable for possibly acquiring an NG area) and 255. The difference between the reference image and measured image is then extracted.

In the present embodiment, many images are handled as a target. Obtained results are compared while the logic and parameters are slightly changed. Eventually, the threshold that has produced the best results is adopted. It is preferred that the threshold value be changed in accordance with the image brightness. The reference threshold value is read from the setup file. However, if the image is relatively dark, the threshold value is decreased accordingly. If the image is relatively bright, on the other hand, the threshold value is increased accordingly.

Next, a noise process is performed. The noise process is performed to eliminate noise from an NG area (image difference area), which is determined by the threshold value process, and leave a truly NG area. Only an obviously NG portion is extracted from an NG candidate area. An area brighter than the threshold value is not simply handled as an NG area. Only an area containing a bright portion and having a large, white, peripheral NG candidate area is handled as an NG area.

In FIG. 27, for instance, the left-hand area is large but has a small maximum brightness value. Therefore, it is not judged as an NG area. The right-hand area has a high brightness level at the center and is therefore entirely detected as an NG area.

When the above process concludes that there is no NG area, the result is satisfactory. However, if the NG area value is 1 or greater, an NG result is obtained so that the NG area is displayed.

As regards the noise process, noise increases when the position adjustment is slightly impaired by moving the comparison target image by 0.5 pixel in eight directions. Therefore, it is possible to employ a method for moving the comparison target image by another 0.5 pixel and handling the least noisy position as the optimum position or a method for judging "displacement" and "difference" from the edge information about an NG area.

A motion picture judgment process performed by the device inspection apparatus according to the present invention will now be described with reference to FIGS. 30 and 35(d). FIG. 30 is a flowchart illustrating a motion picture process. In the present embodiment, the expected value and measured value are avi files. When the expected value and measure value are cut out as still pictures, they are of the same size. However, the shooting times are allowed to differ from each other. Further, it is preferred that the image circumferential frame be displayed in black.

First of all, a motion picture is read from a motion picture file (AVI file) in which a motion picture shot by a camera is stored (step S141). The motion picture is then cut out as still pictures (bitmap images) at 1-frame intervals (30 f/s). This is the number of frames acquired by the image pickup device that has read the images.

Next, the read images are averaged. Averaging is performed by reading the images one by one as indicated in FIG. 33, combining an image two frames earlier (FIG. 31(a)), an image one frame earlier (FIG. 31(b)), and the currently handled image (FIG. 31(c)), and acquiring an average image of these three images (step S143). The average image of the three images is handled as a single image (FIG. 31(d)). This ensures that a smooth motion is obtained by performing an averaging operation even when the expected value cut-out timing does not coincide with the measured value cut-out timing.

Step S144 is performed to acquire data that is used for making a comparison after the measured value is synchronized with the expected value later. Step S145 is then performed to divide the averaged image into four colors (R, G, B, and gray). Each of the averaged images is divided into R, G, B, and gray images. For the gray image, 0.299*red+0.587*green+0.144*blue is used so that the result is similar to the image perceived by the human eye. The gray image is then reduced to half in size (one-fourth in area) and stored in memory (step S146). The acquired gray image is reduced to half in magnification and retained in memory. In this instance, the area is reduced to one-fourth the original size (step S147). The image difference from an image one frame earlier is determined by means of subtraction. This subtraction procedure is performed for each of R, G, B, and gray. A brightened portion and darkened portion are then determined to acquire their total gray value (an integral value of the area and gray value (0 to 255)) (step S148). This step is accomplished by performing processes (1) to (3) below. Process (1) is performed to subtract an image one frame earlier from the current image and acquire a portion brighter than the image one frame earlier as an image (FIGS. 32(a), 32(b), and 32(c)). This process is performed for each of R, G, B, and gray. Process (2) is performed similarly to subtract the current image from the image one frame earlier and acquire a darkened portion as an image. Process (3) is performed to acquire the total gray value (an integral value of the area of a white displayed portion and brightness) of the acquired difference image. This process is performed for each of R, G, B, and gray. This ensures that eight total gray values can be acquired per still picture when a motion picture is cut out as still pictures. A brightened image and darkened image are provided for each of four channels (R, G, B, and gray).

Next, the difference images acquired for R, G, B, and gray are combined. A threshold value process is performed on the resulting image to acquire a difference area (step S148). This step is accomplished by performing processes (1) and (2) below. Process (1) is performed to add up R, G, B, and gray difference images obtained (four channels of difference images). In process (2), the resulting difference image is subjected to threshold value processing with a parameter value of about 50 to acquire a bright area (this parameter can be specified by the user). A brightened area and darkened area of a color image are now acquired.

The brightened image and darkened image are combined and subjected to threshold value processing to acquire an area that involves a difference between adjacent images (step S149). The center of gravity of the area is determined. This step is accomplished by performing processes (1) to (4) below. In process (1), a difference image indicating a brightened portion acquired in step S148 is added to a difference image indicating a darkened portion to obtain a single image. A difference image representing a difference from an image one frame earlier is then acquired. In process (2), a threshold value process is performed with a parameter value of about 50 to acquire a bright portion as an area (this parameter can be specified by the user). This area serves as a difference area representing a difference from an image one frame earlier. In process (3), the center of gravity of the area acquired in process (2) is determined. If there is no difference from the preceding image and the difference area is zero, the center position of the image is substituted. In process (4), a difference image indicating a brightened portion and a difference image indicating a darkened portion are reduced to half size and retained in memory (reduced to one-fourth in area).

Motion picture displacement time is determined to adjust the shooting timing difference between the measured value and expected value (step S150). To permit judgment in a situation where the expected value and measured value differ in shooting timing or shooting time, it is necessary to adjust the time. This step is accomplished by performing processes (1) to (4) below. In process (1), the total gray values obtained in step S147 are compared while the expected value and measured value are shifted by one sheet at a time. While the expected value and measured value agree in time, the total gray value difference is determined per frame. The sum of the total gray value differences is then acquired. In process (2), a candidate whose value is smaller than the immediately preceding value and smaller than the immediately succeeding value is selected because the difference becomes extremely small when the expected value and measured value agree in timing. The value n for maximizing the value $(f(n+1)-f(n))+(f(n-1)-f(n))$ is determined. This is assumed as the difference time for determining a location at which the difference is maximized. In process (3), eight data candidates are arranged in order from the most to the fewest when the times determined for R, G, B, and gray (4 channels) differ from each other. In process (4), if the time candidates acquired for R, G, B, and gray do not coincide with each other, the data is added up on all the channels. The location at which there is the highest resulting sum (the time whose difference from the preceding one and succeeding one is the greatest) is handled as the difference time.

Next, step S151 is performed to compare the measured value data and expected value data with the difference between the measured value and expected value adjusted. In other words, the center of gravity of a moved portion area is compared against that of the preceding image (step S152). This step is accomplished by performing processes (1) to (3) below. This is comparison 1 for the present embodiment. In comparison 1, the center of gravity of the difference area is determined to determine the positional difference. In process (1), the expected value is synchronized with the measured value. The centers of gravity of the expected value and measured value images determined in step S159 are then compared. The X- and Y-coordinate differences are determined. Their ratios to the image width and height are determined (1−X difference/judgment area width, 1−Y difference/judgment area height). In process (2), process (1) is performed for all the images cut out. The results are then averaged to obtain an average value. If the average value is small, the coincidence rate is low (the difference is insignificant when the value is closed to 1). In process (3), the determined value (0 to 1.0) is handled as a comparison result and designated as result 1.

Images shown in FIGS. 33(a) and 33(b) indicate that an icon is blinking at different locations. Therefore, comparison 1 reveals that the images differ from each other.

The expected value and measured value movement areas are compared (step S153). This comparison is made on a brightened area and on a darkened area. This step is accomplished by performing processes (1) to (5) below.

This is comparison 2 for the present embodiment. In comparison 2, the movement area difference is eliminated to check for motion difference. In process (1), the measured value is synchronized with the expected value. The difference between the expected value and measured value areas determined in step S148 is then eliminated. In process (2), the "moved expected value area or measured value area" is acquired. The expected value and measured value images having an increased brightness and those having a decreased brightness (four types in total) are added together for synthesis. The resulting image is subjected to threshold value processing to acquire a brightly displayed portion as an area. An expansion/contraction process is performed on the acquired area to obtain an adequate area. This is handled as a "moved area." In process (3), the difference between the expected value and measured value is acquired. This procedure is performed for an image whose brightness is increased and for an image whose brightness is decreased. When the expected value and measured value change in the same manner and their difference is eliminated, the area disappears due to offsetting. However, if the move locations differ, the area remains even when the difference is eliminated. In process (4), a threshold value process is performed on the images handled in process (3) above with a parameter value of about 50 to acquire a bright portion as an area (this parameter can be specified by the user). The area of an image whose brightness is increased is added to the area of an image whose brightness is decreased to acquire a single move difference area. Process (5) is performed to determine the difference area ratio between the expected value and measured value that are acquired in process (4), which is performed on the "moved area." Next, the ratio of the "moved area," which is determined in process (2) above, to the image judgment target area is determined. When this area is small, the ratio is rendered lower than that of the difference area acquired in process (5). Processing is required because the moved area is smaller than the judgment area, which means that the motion picture does not considerably move. In other words, the difference is small although the expected value motion picture differs from the measured value motion picture. When the difference area ratio (0 to 1) between the expected value and measured value, which is determined in relation to the "moved area," is subtracted from the value 1, it is possible to determine the ratio (coincidence rate) at which the expected value and measure value move in the same manner. The greater (the closer to the value 1) this value, the higher the coincidence rate. In process (6), the value indicated in process (5) above is determined for all images. The average value per image is then determined by dividing the sum of all image values by the number of images. The value determined in this manner (0 to 1.0) is handled as a comparison result and designated as result 2.

Comparison 2 above indicates that the two images shown in FIGS. 34(a) and 34(b) are different from each other.

The image difference involved in a reduced image is eliminated for comparison purposes. A comparison is made to determine the degree of difference involved in the entire image including a background (step S154). This step is accomplished by performing processes (1) and (2) below. This is comparison 3 for the present embodiment. In comparison 3, the absolute values of images are used for judgment purposes. Comparison 3 notes the difference involved in a stationary state. In process (1), the expected value and measured value are synchronized with each other. In the resulting state, the image difference between the expected value and measured value, which are acquired in step S156, is eliminated. First of all, the expected value and measured value are subjected to position adjustment. More specifically, a pattern matching procedure is performed for the measured value image with reference to the expected value. An affine transformation is then performed to move the measured value to the determined location. When the expected value and measured value agree in time, all the images are subjected to position adjustment. After position adjustment, the image difference between the expected value and measured value is eliminated. In process (2), the moved area acquired in process (2) in step S163 is subtracted from the difference area representing the difference between the expected value and measured value, which is acquired in process (1) above. The difference involved in the background (still picture portion) only is then obtained. A threshold value process is performed on the difference image. The larger the remaining area becomes, the lower the coincidence rate is. In process (3), the square of the result (<1) is handled as a solution because the area difference is sufficiently visible to the human eye even when it is not 100%. In process (4), the square of the determined value (0 to 1.0) is handled as a comparison result and designated as result 3. The other processes do not make an image absolute value comparison. All the other processes use a relative position for comparison purposes. Therefore, if the images differ in overall brightness, the comparison result indicates that the images are identical with each other.

Comparison 3 can conclude that the two images shown in FIGS. 35(a) and 35(b) differ from each other.

The above comparison elements are then multiplied together to obtain the final result (step S155). After the expected value and measured value are synchronized with each other, results 1, 2, and 3 are acquired and multiplied together (the value between 0 and 1.0 is then obtained). The obtained value is multiplied by 100 to return a percentage value.

When the result (0 to 100) is returned (step S156) and is not smaller than a threshold value, the result is acceptable. However, the result is unacceptable if it is smaller than the threshold value. A sound judgment formulated by the device inspection apparatus according to the present invention will now be described with reference to FIGS. 36 to 38. The present embodiment formulates a DTMF judgment (FIG. 36), BT/RBT judgment (FIG. 37), and melody judgment (FIG. 38).

First of all, the DTMF judgment will be described with reference to FIG. 36.

A DTMF (Dual Tone Multi-Frequency) signal is an audio signal that is assigned to each telephone button (0 to 9, *, or #) and comprises two different frequencies. In DTMF judgment, a measured value acquired via a microphone is analyzed to judge whether the type of an audio signal contained in the measured value agrees with a DTMF number (0 to 9, *, or #) specified as an expected value.

A DTMF sound is a specific combination of predetermined frequencies. Therefore, the frequency information about each DTMF sound is used as an expected value. No sound data is retained as an expected value. The table below shows the frequency information about each telephone button.

TABLE 1

| | High frequencies | | |
|---|---|---|---|
| Low frequencies | 1209 Hz | 1336 Hz | 1447 Hz |
| 697 Hz | 1 | 2 | 3 |
| 770 Hz | 4 | 5 | 6 |
| 852 Hz | 7 | 8 | 9 |
| 941 Hz | * | 0 | # |

The judgment procedure is described below. First of all, step S211 is performed to operate a pushbutton. Next, step S212 is performed to note measured values and acquire two frequencies with which the maximum sound volume is recorded. The acquired values are then loaded into an expected value WAVE file.

Next, the read WAVE data is subjected to FFT (Fast Fourier Transform) to acquire a sound volume data array, which indicates the sound volume level of each frequency (step S213). The array index then indicates a frequency band, and the data on each index becomes a sound volume level.

Next, the acquired sound volume data is divided into a low frequency region (650 to 970 Hz) and high frequency region (1150 to 1500 Hz) in which a DTMF frequency band is recorded (step S214). One data having the highest sound volume level recording is acquired from each of the low and high frequency regions (step S214). The acquired two data are handled as the measured frequencies of the DTMF sound.

Further, the low and high frequencies (two frequencies) of a DTMF number that is specified as an expected value are compared against the low and high frequencies (two frequencies) derived from the measured values (step S216). If the difference between the compared frequencies is within a fixed tolerance (±20 Hz), it is concluded that the compared frequencies are in agreement with each other (steps S217 and S218). If the difference is outside the tolerance, it is concluded that a nonconformity exists (step S219). BT/RBT (busy tone/ringback tone) judgment will now be described with reference to FIG. 37. The BT (busy tone) is an audio signal (beep-silence-beep) for indicating that a call's terminating location is already in use. The RBT (ringback tone) is an audio signal (brrr-silence-brrr) for indicating that the called-party instrument is being sent a ringing signal. The above "beep" or "brrr" portion is referred to as ON data. The above "silence" portion is referred to as OFF data.

In BT/RBT judgment, a measured value obtained via a microphone is analyzed to judge whether the type of an audio signal contained in the measured value agrees with the BT or RBT that is specified as an expected value.

The RBT and BT have their own tone generation pattern (intermittent pattern comprising the OFF data and ON data). The patterns are digitized for use as an expected value. Therefore, the sound data used for this process is a measured value only.

A detailed judgment procedure will now be described. First of all, a pushbutton is operated (step S221) to acquire a generated tone (step S222). The expected value WAVE file is then read. The read WAVE data is subjected to FFT to acquire a sound volume data array, which indicates the sound volume level of each frequency (step S223). In this process, the array index indicates a frequency band, and the data on each index becomes a sound volume level (step S224).

Next, step S225 is performed to check whether the contents of the sound volume data array agree with the BT/RBT frequency band (400 Hz±20 Hz). When the difference is within a predetermined tolerance, it is concluded that the ON data is encountered. When the difference is outside the predetermined tolerance, it is concluded that the OFF data is encountered. The time base is examined so as to acquire a generated tone pattern array for which the number of ON data and the number of OFF data are calculated.

Next, the expected pattern and the acquired tone pattern are compared. First of all, the effective portion of the measured pattern is recognized. If, in this instance, the OFF data is contained at the beginning of the measured value, such a portion is discarded. The portion beginning with the ON data is regarded as the effective data.

Next, the expected pattern and measured pattern are compared along the time base beginning with the effective portion of the measured pattern. If the difference in the number of ON/OFF data elements at tone generation intervals is within a predetermined tolerance, the associated position is regarded as a part of the pattern of the specified tone.

If the same pattern as the expected pattern persists for a certain range, it is concluded that agreement is attained. If not, it is concluded that agreement is not attained.

Melody judgment will now be described with reference to FIG. 38. In the present embodiment, the term "melody" refers to melodic sound data other than the aforementioned DTMF, BT, and RBT sound data.

In melody judgment, a measured value acquired via a microphone is analyzed to judge whether the sound data contained in the measured value agrees with the sound data that is specified as an expected value. The judgment result is indicated by a coincidence rate, which indicates the degree of agreement between the sound data contained in the measured value and the sound data specified as the expected value.

For coincidence rate determination processing and data generation, a commonly used sound library (e.g., Animo's VoiceBase II library) is used. A judgment is formulated by checking whether the coincidence rate value derived from the judgment process is greater than the system default value or user-defined coincidence rate threshold value.

An expected value and measured value (two values) are used as the sound data for the melody judgment process.

First of all, process data derived from the expected value and measured value are acquired. In other words, the expected value and measured value WAVE files are read (step S231). Next, a no-sound interval is detected (through the use of a sound library) to acquire the effective data start position (step S232). In this instance, the data amount for each process data unit (frame) is determined in accordance with the effective data lengths of the expected value and measured value.

Next, the process data is subjected to window function processing (sound library) and FFT filter bank analysis (sound library) to acquire matching process data (step S233). The expected value and measured value are then compared by a DP method (sound library) to acquire distance data (step S234). A coincidence rate is calculated from the acquired distance data (step S236).

When the calculated coincidence rate is not smaller than a specified coincidence rate threshold value, it concluded that agreement is attained. If the calculated coincidence rate is smaller than the threshold value, it concluded that agreement is not attained. (step S236 to S238)

When the above processes are performed on a predetermined melody, the sound judgment process terminates.

Second Embodiment

FIGS. 39 and 40 are perspective views that conceptually illustrate one embodiment of a cellular phone retainer according to the present invention. FIG. 39 indicates that a cellular phone 1, whose cover 102 is open, is retained by a plurality of movable or immovable support members 101, and that the cellular phone 1 is pressed by a detachable rubber string or other elastic member 103, which provides an enhanced holding capability. FIG. 40 illustrates a state in which the cellular phone 1 shown in FIG. 39 is removed. FIG. 41 is a plan view that illustrates in detail the state indicated in FIG. 39. FIG. 42 is a side view that illustrates in detail the state indicated in FIG. 39.

The plurality of support members 101 comprise a pair of immovable guide support members 101*a*; two parent sliders 101*b*, which are mounted on the guide support members 101*a* and can slide in the axial direction of the guide support members 101*a* to change their positions; child sliders 101*c*, which are mounted on the parent sliders 101*b* and can slide in the axial direction of the parent sliders 101*b*, that is, in a direction perpendicular to the sliding direction of the parent sliders 101*b*; and an immovable retention support member 101*d*, which is positioned parallel to the parent sliders 101*b* and placed between the guide support members 101*a*. The parent sliders 101*b* support the bottom surface of the cellular phone 1. The child sliders 101*c* support the lateral surfaces of the cellular phone 1. The retention support member 101*d* is used as a support member for providing an enhanced capability for holding the cellular phone 1.

In the embodiment shown in the figures, there are only two parent sliders 101*b* on which the child sliders 101*c* are mounted. However, the number of parent sliders may be increased to four. One of the four parent sliders may be used to vary the height of the lower section of the cellular phone. Another parent slider may be used to press the lateral surfaces of the LCD panel 3 on the cover 102 instead of the main body 1*a* of the cellular phone 1. The remaining two parent sliders may be used to perform the same functions as in the embodiment shown in the figures.

Further, the child sliders 101*c* may use a replaceable sliding part. The following three types of sliding parts may be mounted as appropriate. Sliding part (1) presses the cellular phone in the directions of the height and width (embodiment shown in the figures). Sliding part (2) presses the lateral surfaces of the LCD panel 3 of the cellular phone 1 (this sliding part should preferably be approximately 10 cm high so as to properly handle the LCD panel 3, which may vary in height). Sliding part (3) presses the cellular phone 1 only in the direction of the height (this sliding part should preferably have the same height as the embodiment shown in the figures and be shaped so as not to interfere particularly with a side button and cable provided on a lateral surface of the main body 1*a* of the cellular phone 1).

The child sliders 101*c* may be structured the same as calipers. However, when the employed child sliders 101*c* are structured in such a manner, they use a gear so that there is play. When such child sliders 101*c* are used to hold the cellular phone 1, one side can be secured but the other side may be loose. When a side button is pressed, the camera image may be adversely affected by the slightest play. It is therefore necessary to secure both sides of the cellular phone 1. For example, the child sliders 101*c* may be screwed down to fix their position. If the use of one screw is not enough to eliminate play, the child sliders 101*c* may be screwed down at two places.

As described above, a rubber string or other elastic member 103 is installed from above to apply tension to position the child sliders 101*c* at the center between the guide support members 101*a* or prevent the LCD panel 3 of the cellular phone 1 from rising. A hole 101*b* is made in a part 101*ba* that constitutes a child slider 101*b* as indicated in FIG. 43. A spherical or other similar member 103*a*, which is provided for the elastic member 103, is lodged in the hole 101*bb* to secure the elastic member 103. The hole 101*bb* should be made in the parts of all the child sliders 101*c* so that the elastic member 103 can be mounted in various places. In the embodiment shown in the figures, a rubber string or other elastic member 103 is used. However, a spring may alternatively be used.

It is preferred that the positions of the child sliders 101*c* be changeable by loosening their retaining screws and without having to remove the retaining screws. It is also preferred that the parent sliders 101*b* be graduated or otherwise marked, thereby permitting the child sliders 101*c* to be fastened again to desired locations.

To handle various types of cellular phones 1, which may have variously shaped and structured ends, it is preferred that immovable support members 101*e* for retaining the end of the main body 1*a* of the cellular phone 1 be screwed down or otherwise fastened to the base and replaceable.

INDUSTRIAL APPLICABILITY

The present invention is not only capable of inspecting cellular phones but also applicable to PDAs, car navigation systems, and other similar devices.

Further, the present invention can inspect a device that changes its internal state in accordance with an external input, including an object-contact-based input such as a button press, operating control rotation, and touch panel contact/drawing input, audio input, camera input or other image signal input, wired signal input from a connector, and radio or infrared wireless signal input, and includes output means to transmit an external output, including video and audio, in accordance with a change in the internal state.

Furthermore, the present invention is capable of causing a robot having an appropriate degree of freedom (e.g., 3-axis or 6-axis robot) to sequentially press a plurality of buttons. Buttons and other operating controls that are arranged three-dimensionally can be accurately operated particularly when a multi-axis robot is used.

Moreover, the inspection item output means of the present invention generates an appropriate output when the inspection target device uses an external input, including operating control rotation, touch panel contact/drawing input, audio input, camera input or other image signal input, wired signal input from a connector, and radio or infrared wireless signal input.

A cellular phone or car navigation device may also be tested in an environment in which the present invention is connected to an externally connected programmable power supply, radio wave generator, signal generator, measuring instrument, and like apparatuses and their control software. When a control statement for such an external apparatus is written in a scenario, the external apparatus control function of the present invention communicates with external control module software for individual apparatus control and performs a coordinated test. An external control module is furnished for each connected apparatus, communicates with the device inspection system in accordance with a predetermined protocol, and controls the external apparatus or acquires a value and delivers it to the device inspection system.

BRIEF DESCRIPTION OF DRAWINGS

Figure 9:
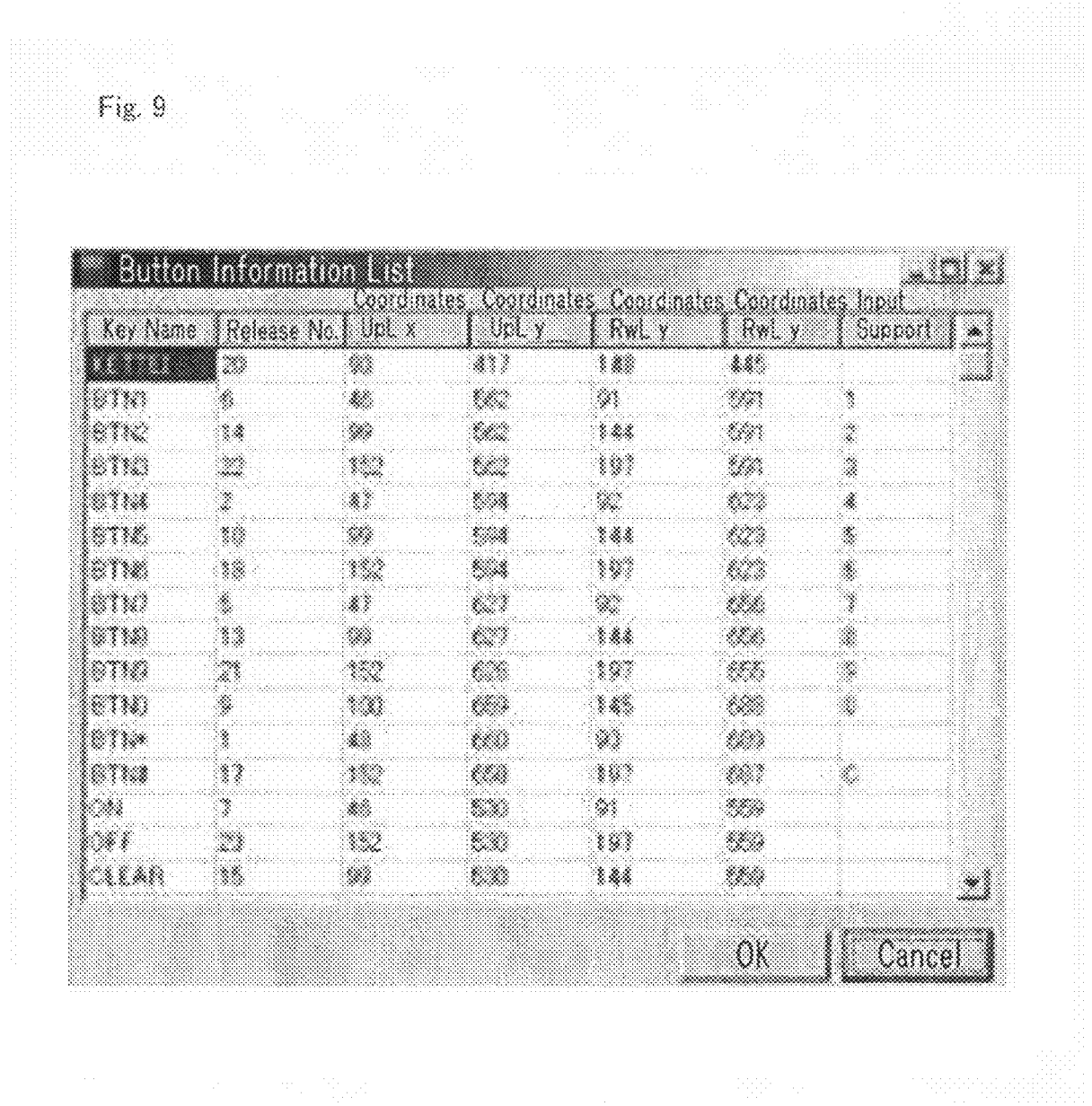

FIG. 9 shows a button information list screen.

FIG. 20 shows a button correspondence table.

FIGS. 29(a) and 20(b) show a threshold value determination process that a cellular phone inspection apparatus according to one embodiment of the present invention performs as a part of a still picture judgment process operation.

DESCRIPTION OF REFERENCE NUMERALS

Figure 1:
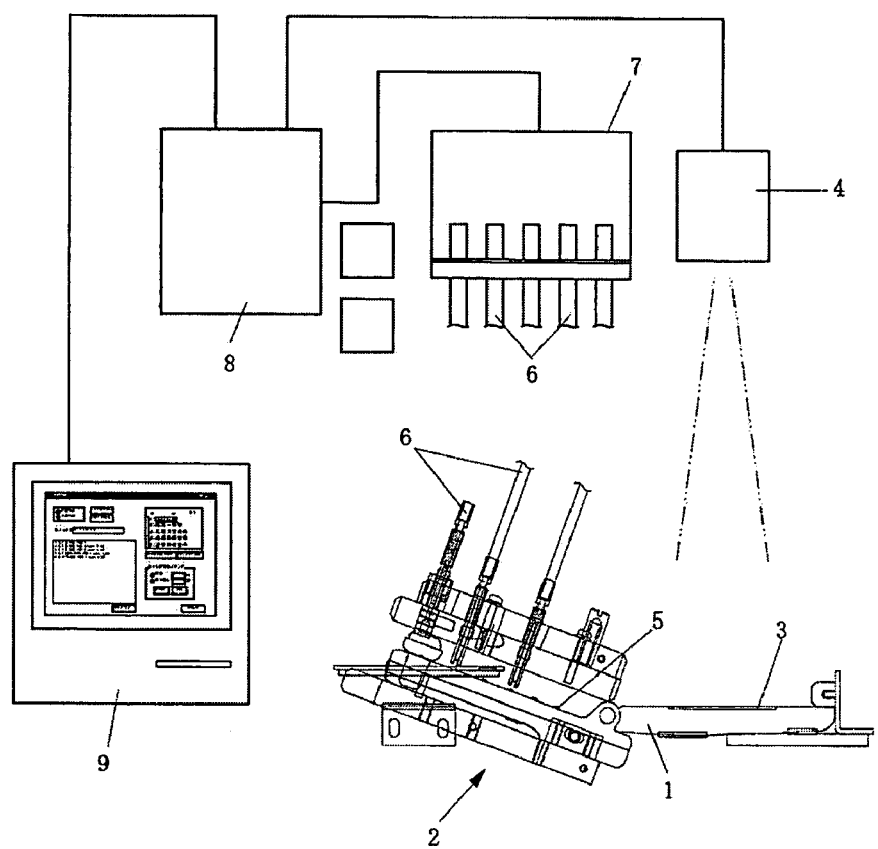
FIG. 1 is a cross-sectional side view that conceptually illustrates one embodiment of a cellular phone inspection apparatus according to the present invention.
Figure 2:
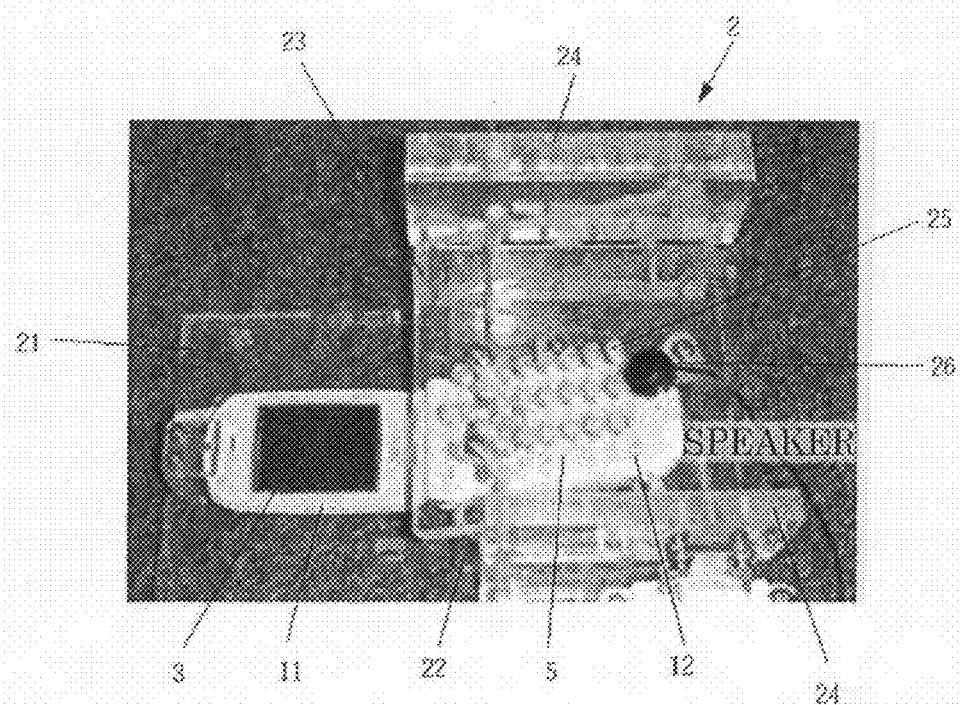
FIG. 2 is a perspective view illustrating an adapter unit and a cellular phone that is fastened onto the adapter unit.
Figure 3:
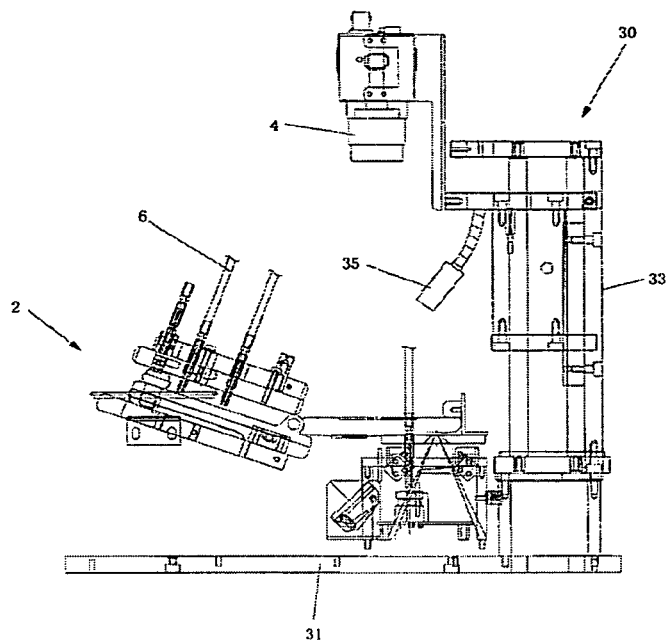
FIG. 3 is a side view illustrating a base unit on which a camera or like device is mounted.
Figure 4A:
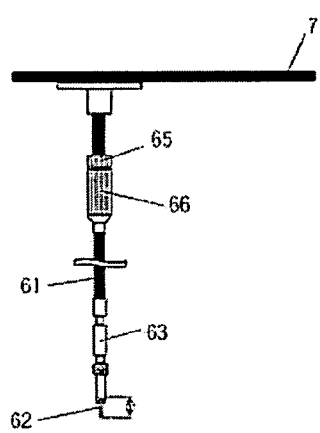
FIG. 4 illustrates a release that is provided for a plunger unit.
Figure 4B:
Figure 5:
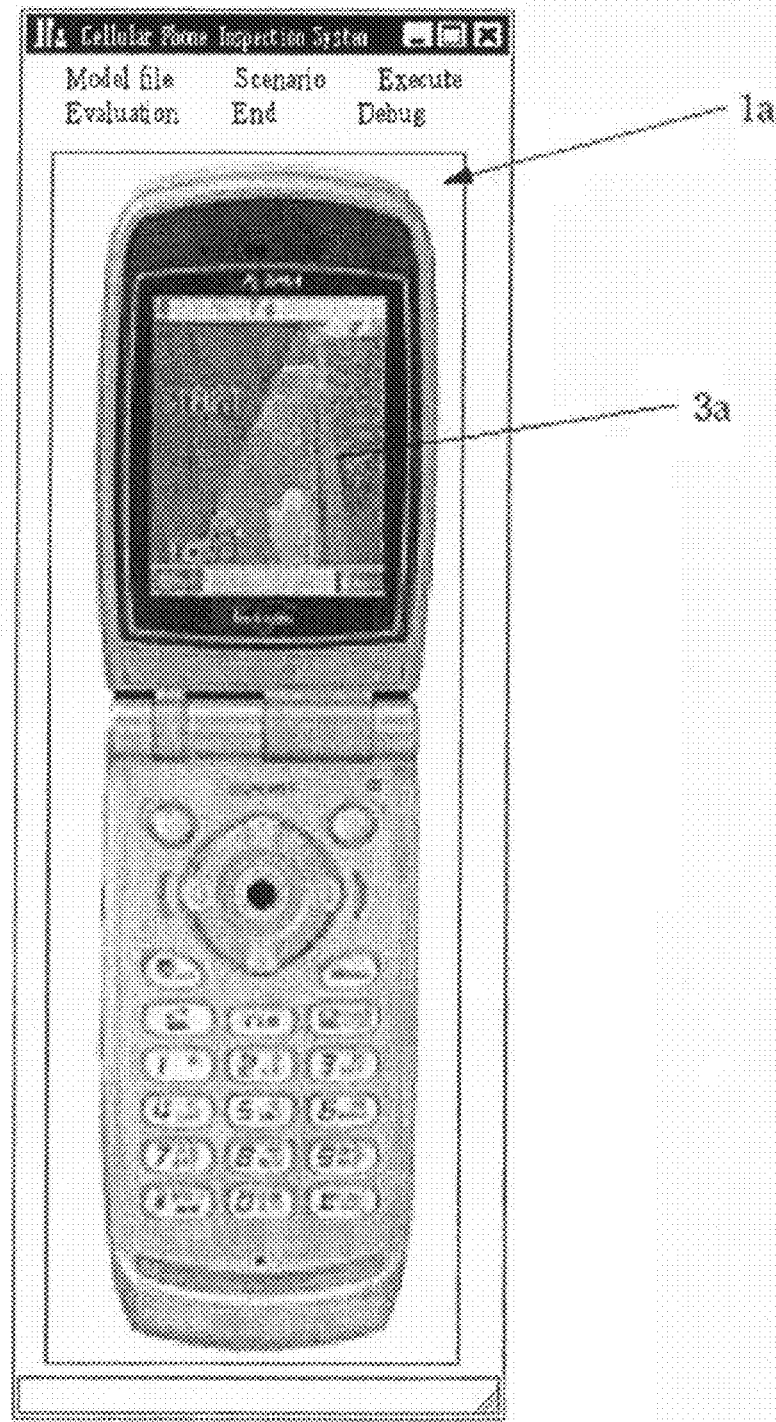
FIG. 5 illustrates a main screen.
Figure 6:
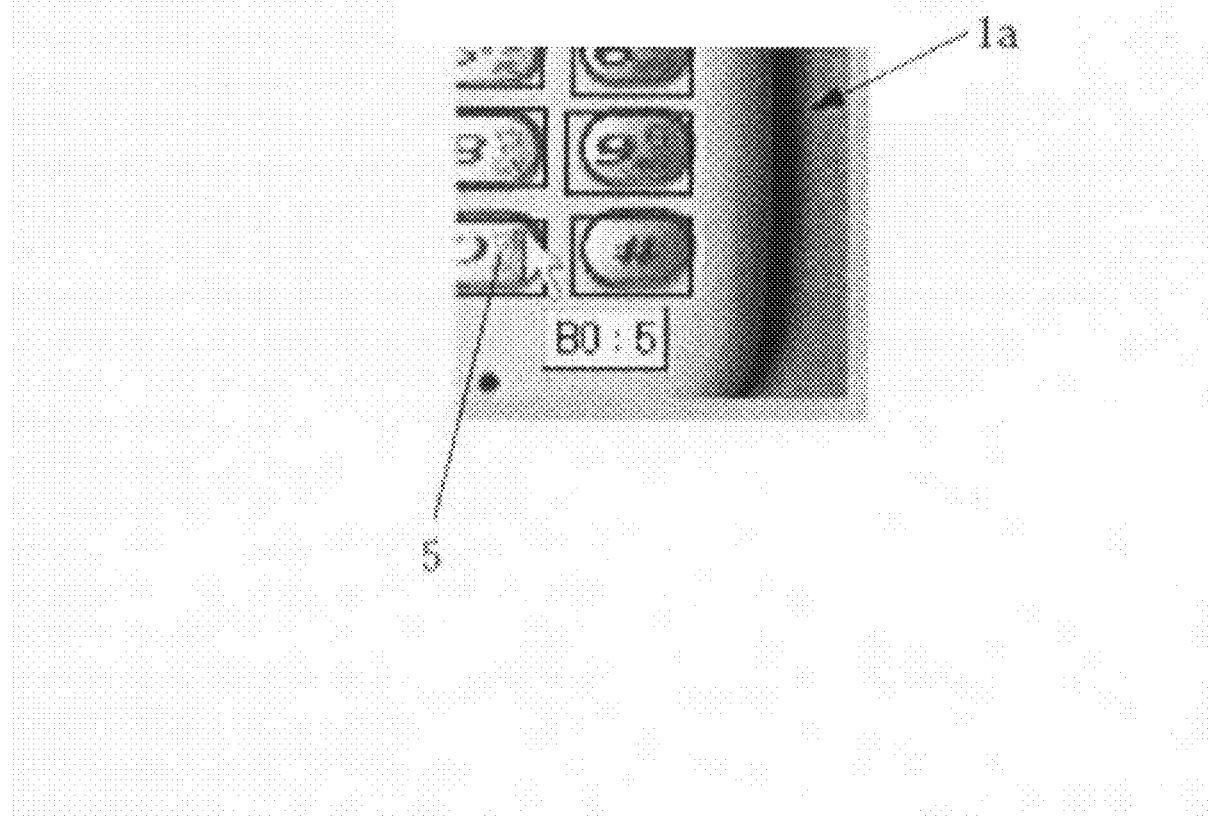
FIG. 6 shows that a key button range is specified from the main screen.
Figure 7:
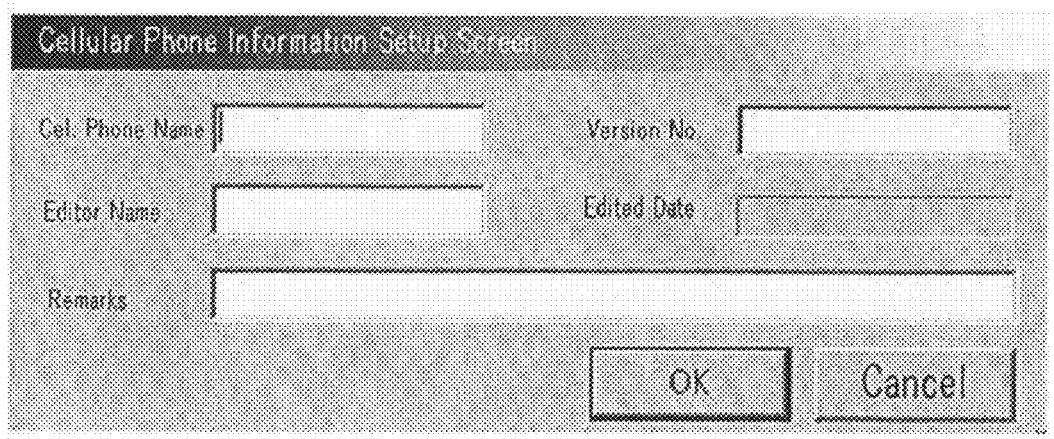
FIG. 7 shows a cellular phone information setup screen.
Figure 8:
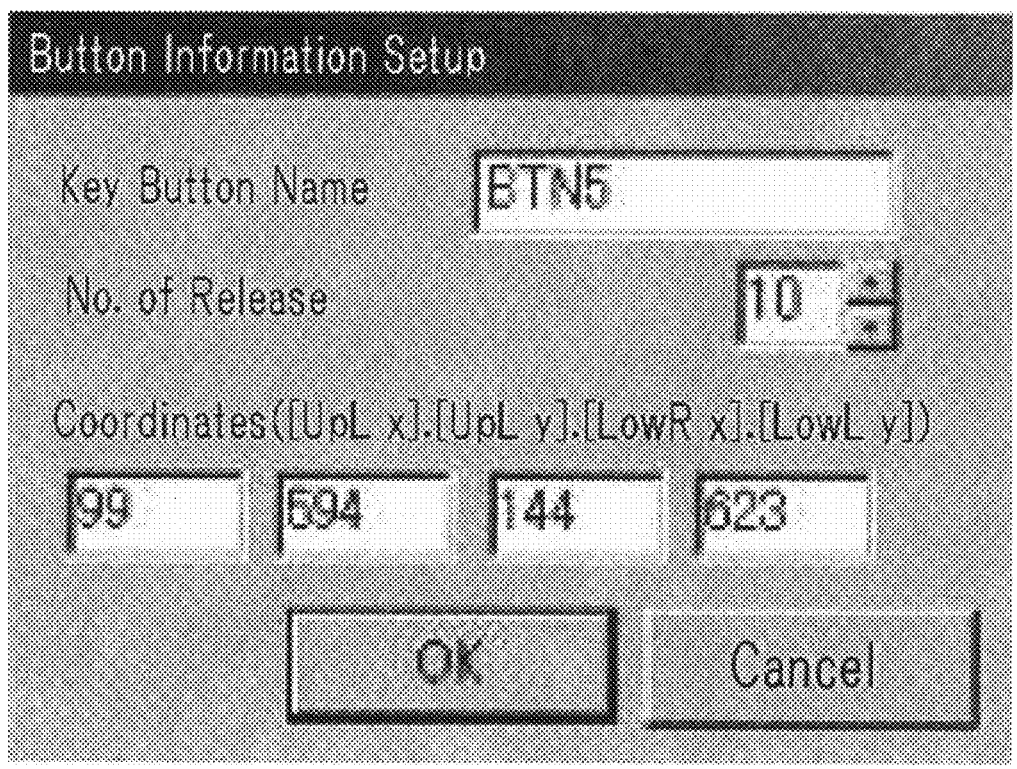
FIG. 8 shows a button information setup screen.
Figure 10:
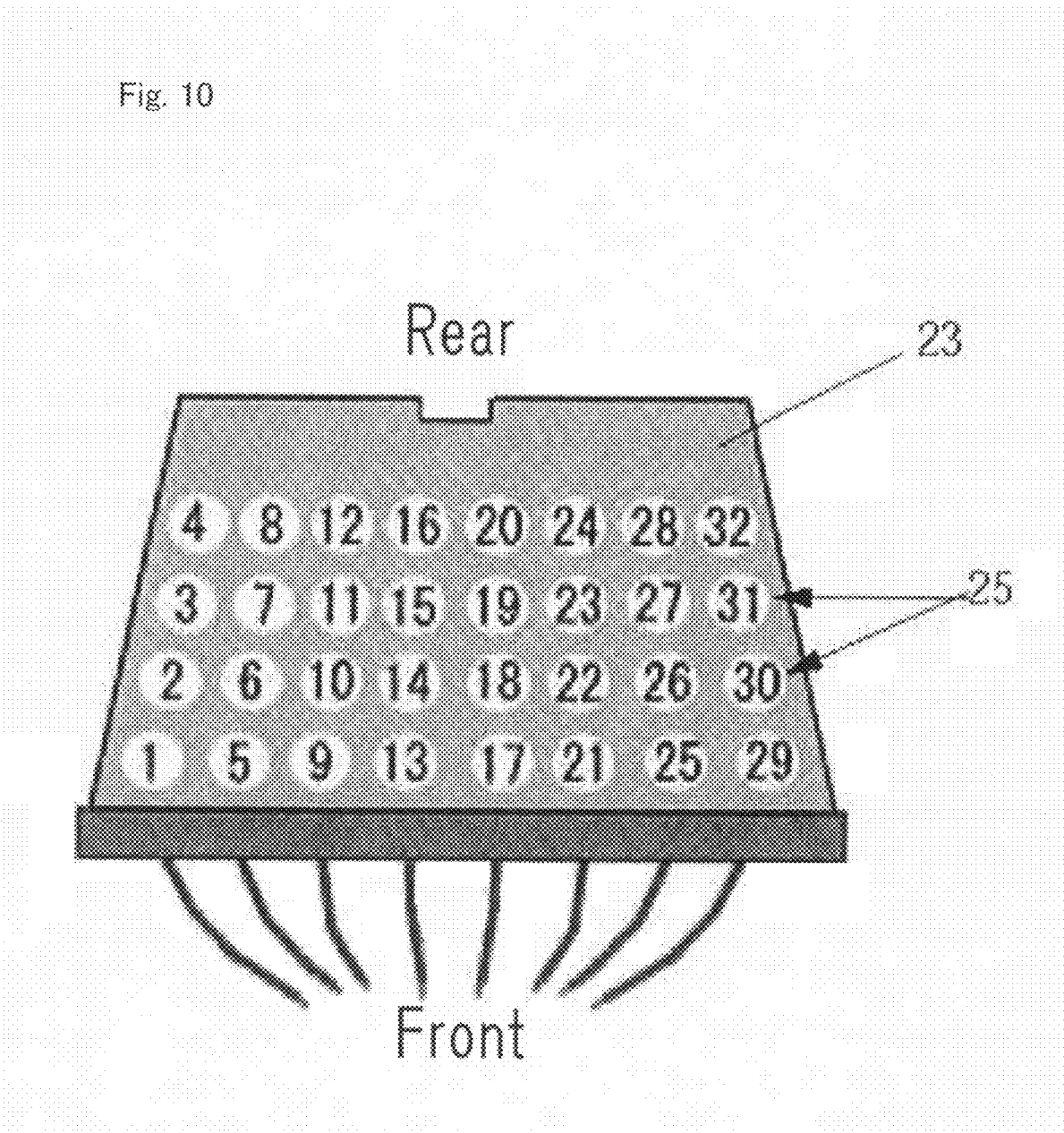
FIG. 10 shows a typical release number input for key button information setup.
Figure 11:
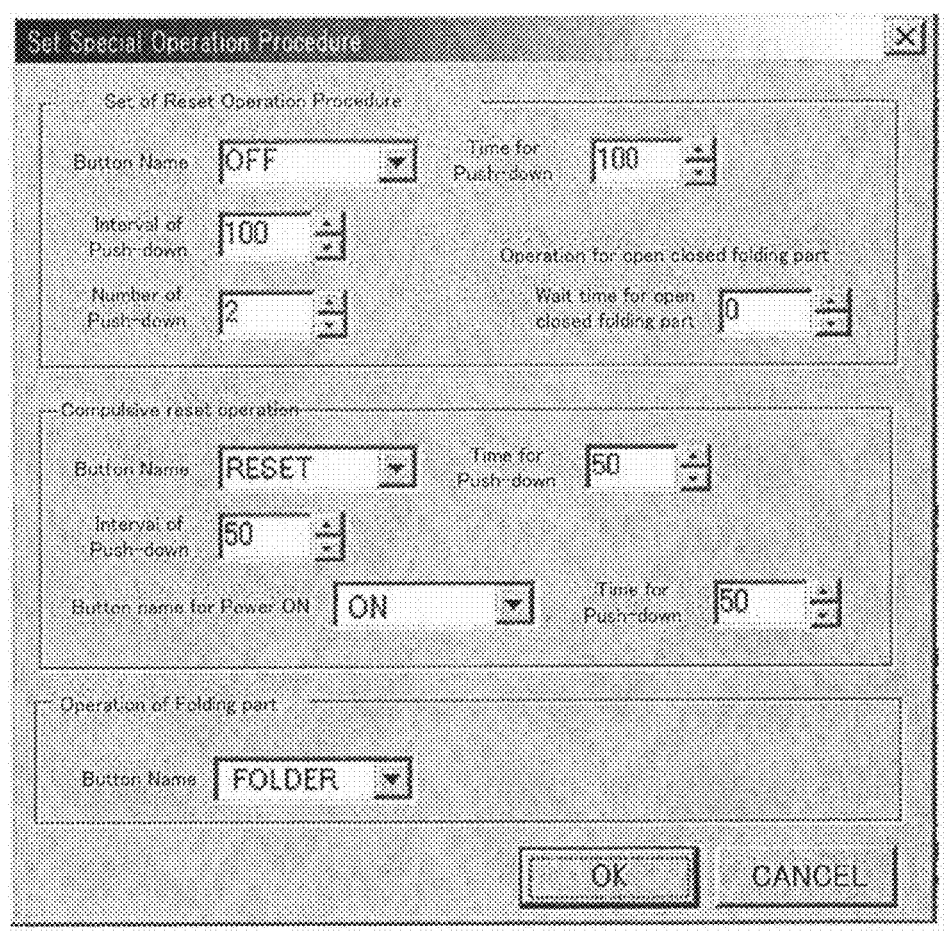
FIG. 11 shows a reset button setup screen.
Figure 12:
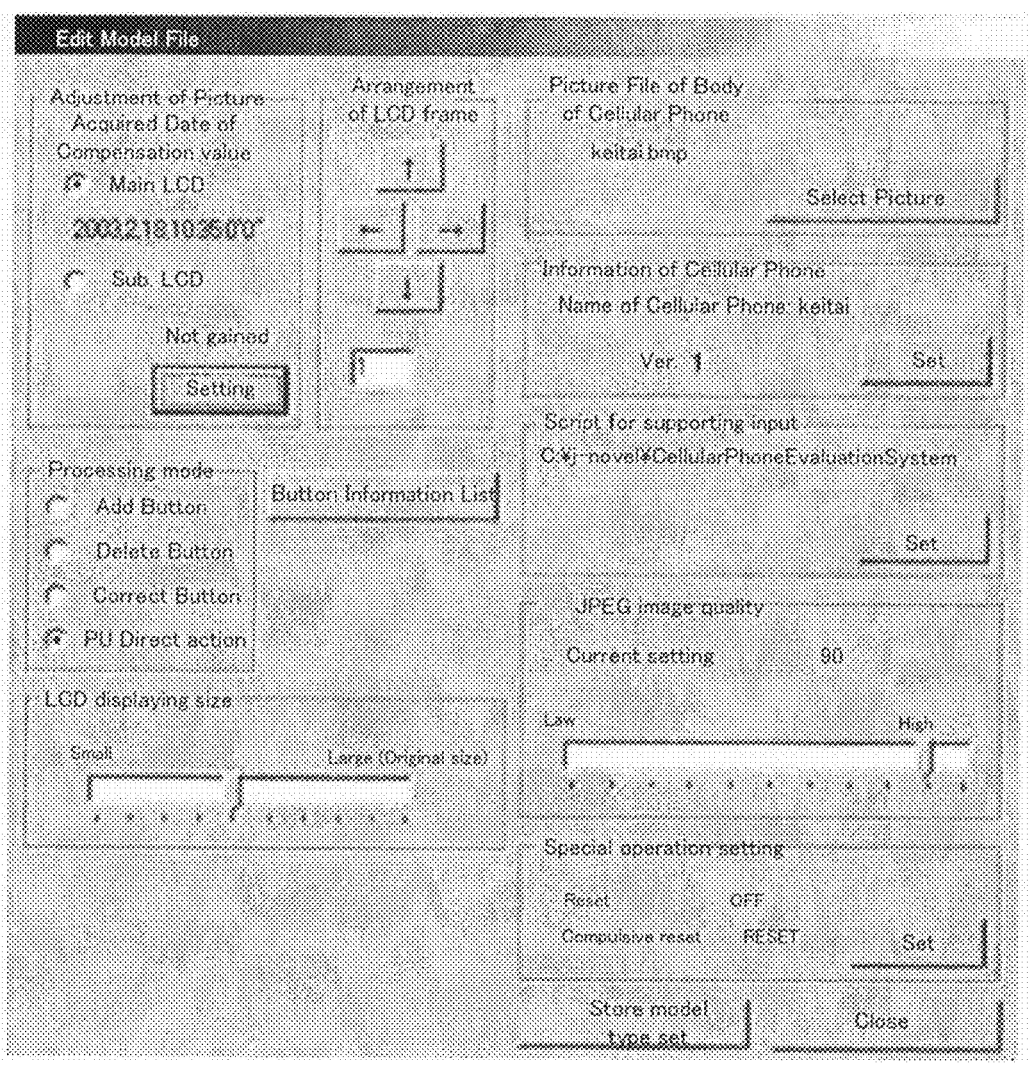
FIG. 12 shows a model file editing screen.
Figure 13:
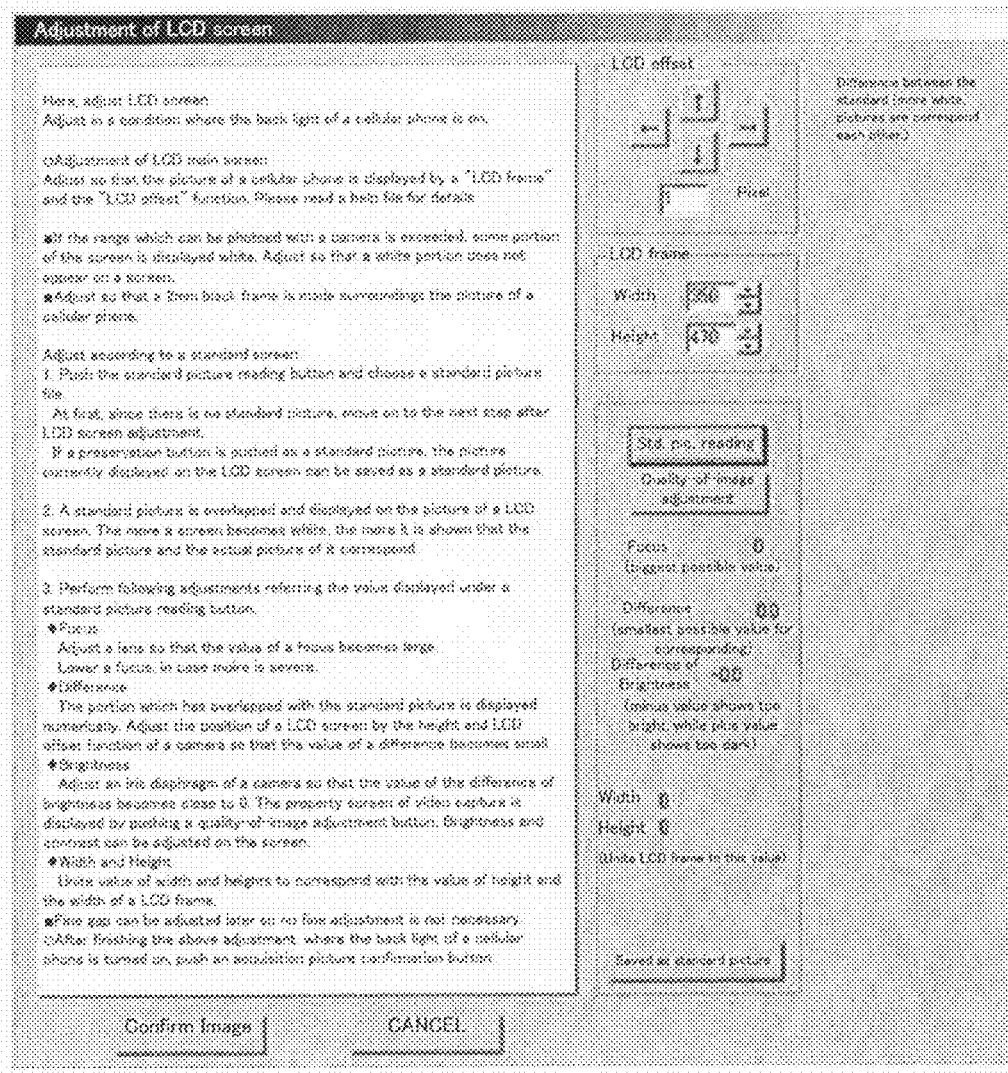
FIG. 13 shows the contents of an LCD panel adjustment screen.
Figure 14:
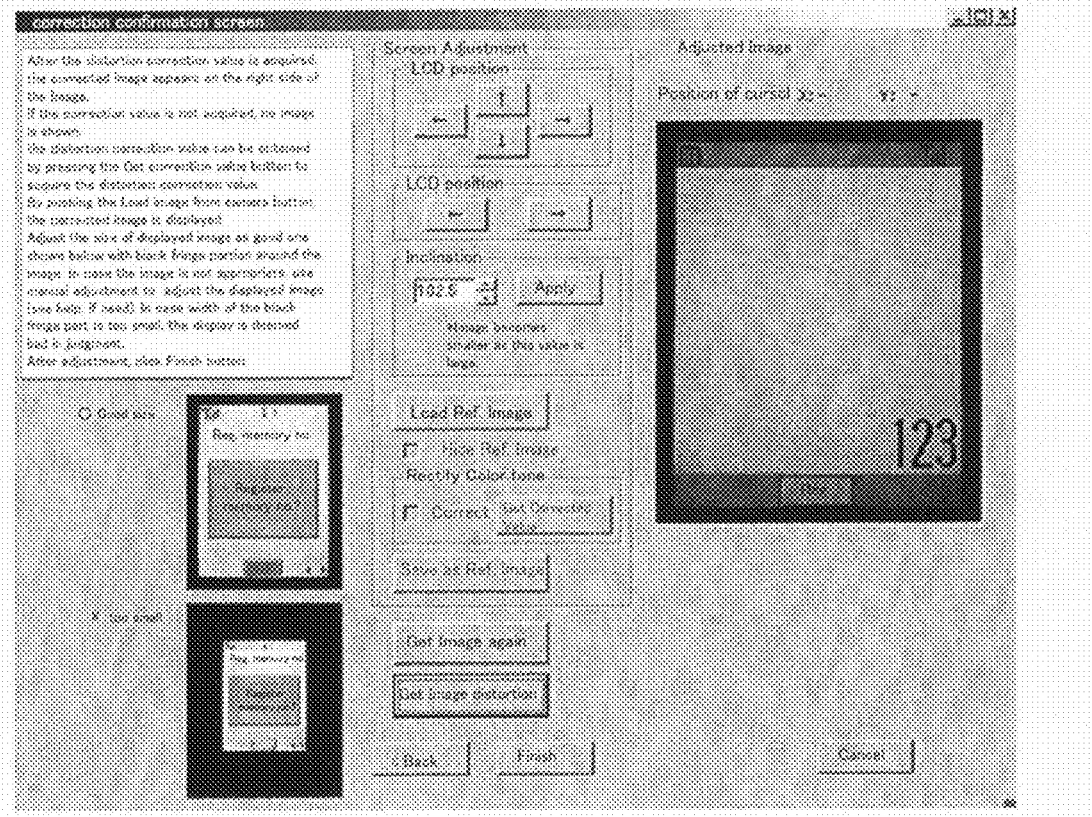
FIG. 14 shows a screen for confirming a corrected image.
Figure 15:
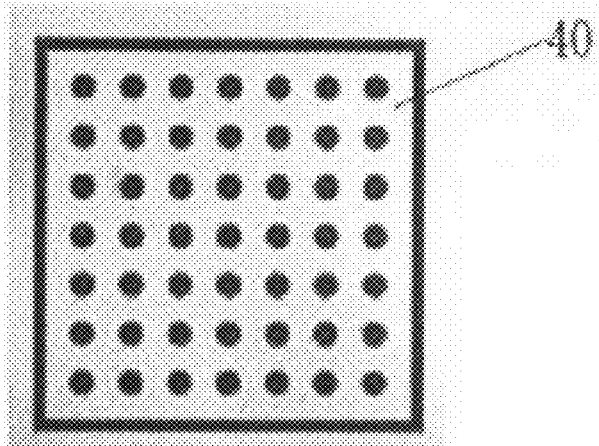
FIG. 15 shows a calibration sheet.
Figure 16:
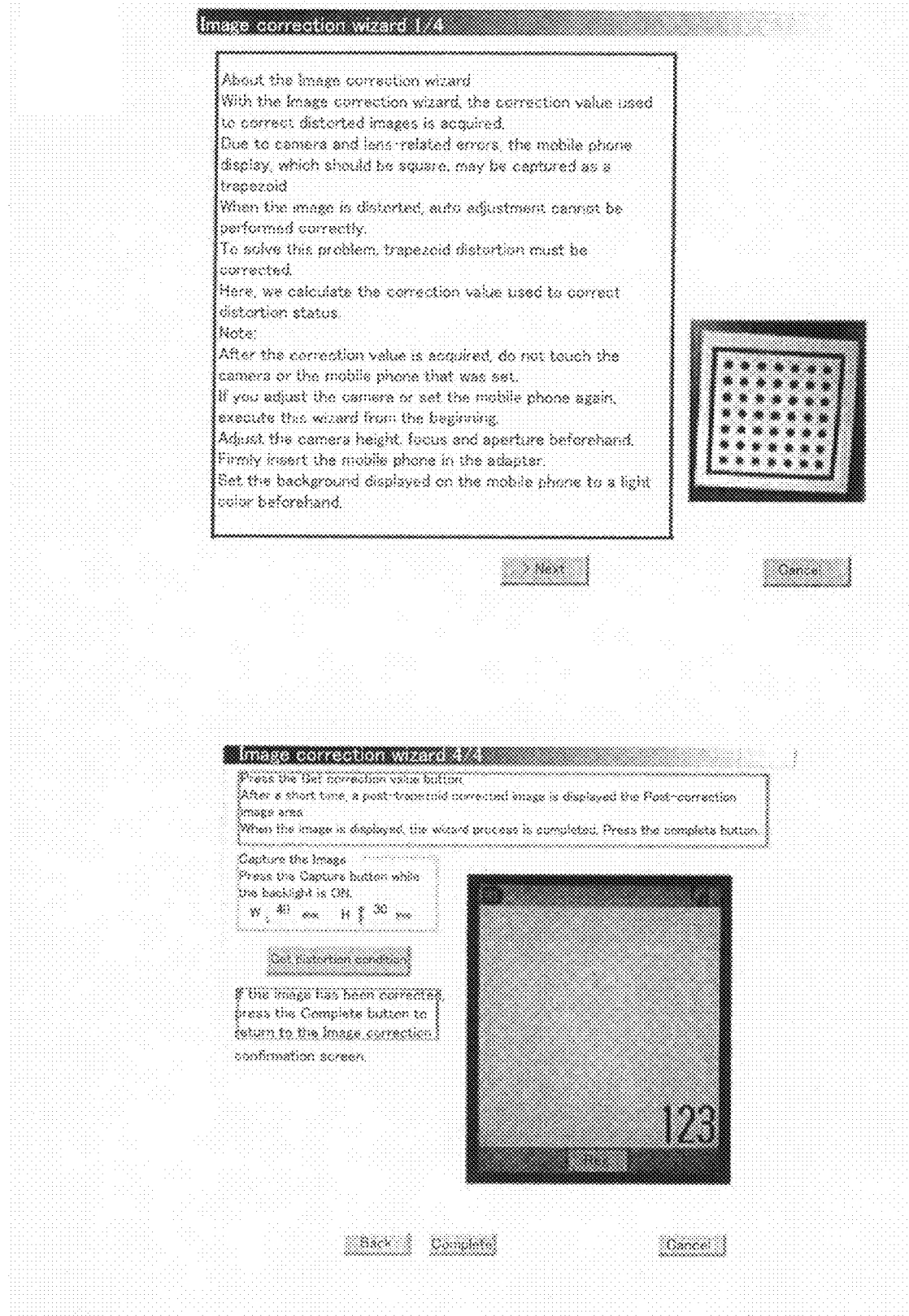
FIG. 16 shows a degree-of-distortion acquisition wizard screen.
Figure 17:
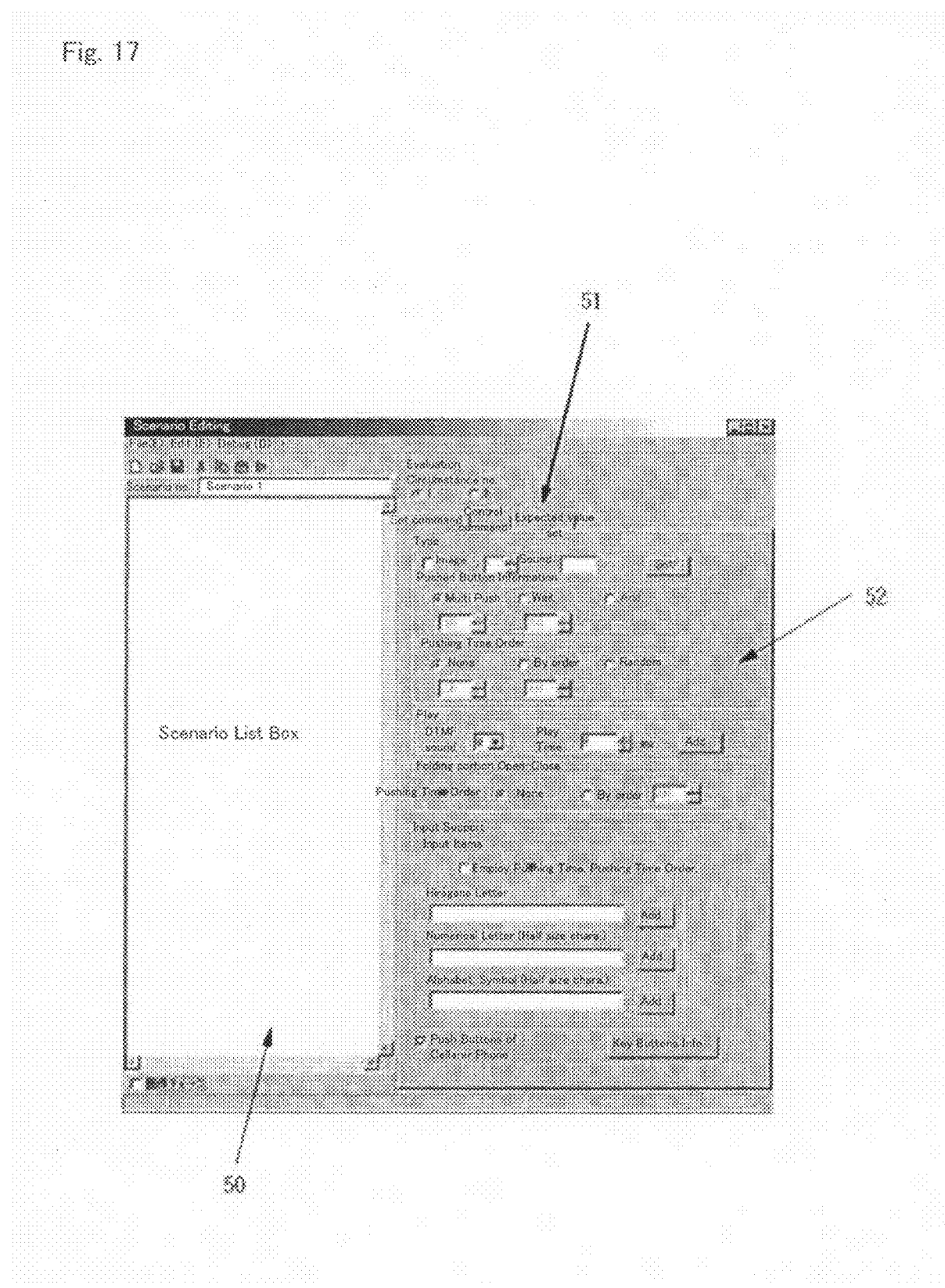
FIG. 17 shows a scenario creation editing screen.
Figure 18:
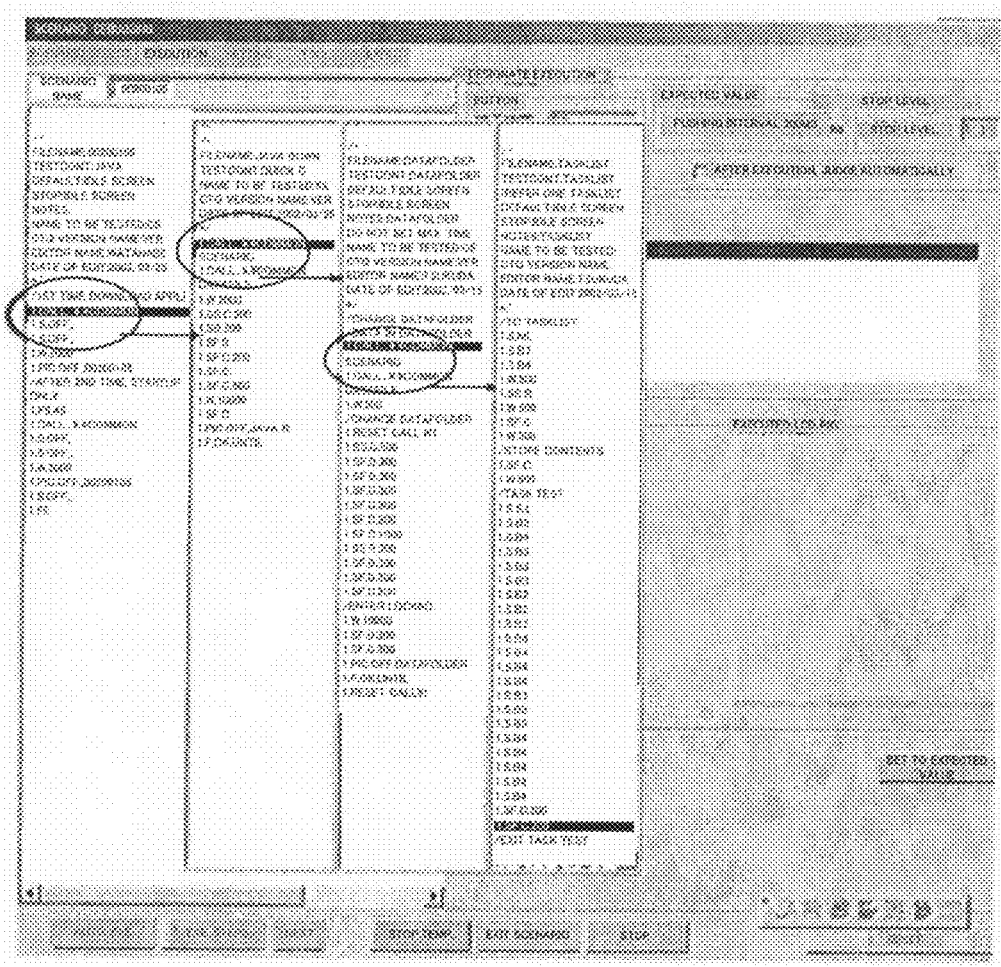
FIG. 18 shows an example in which a plurality of scenarios are recalled.
Figure 19:
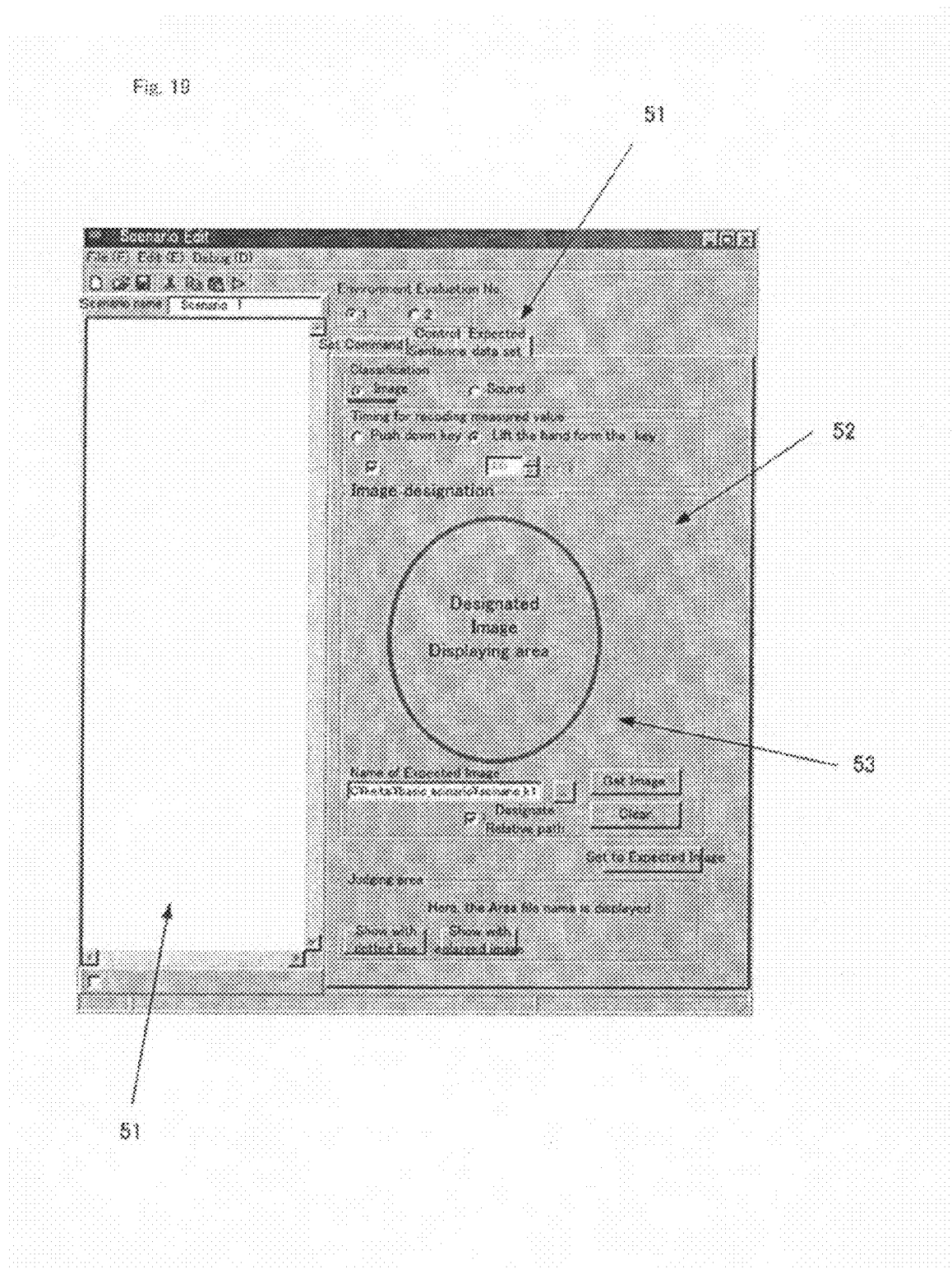
FIG. 19 shows the contents of an expected value setup tab.
Figure 21:
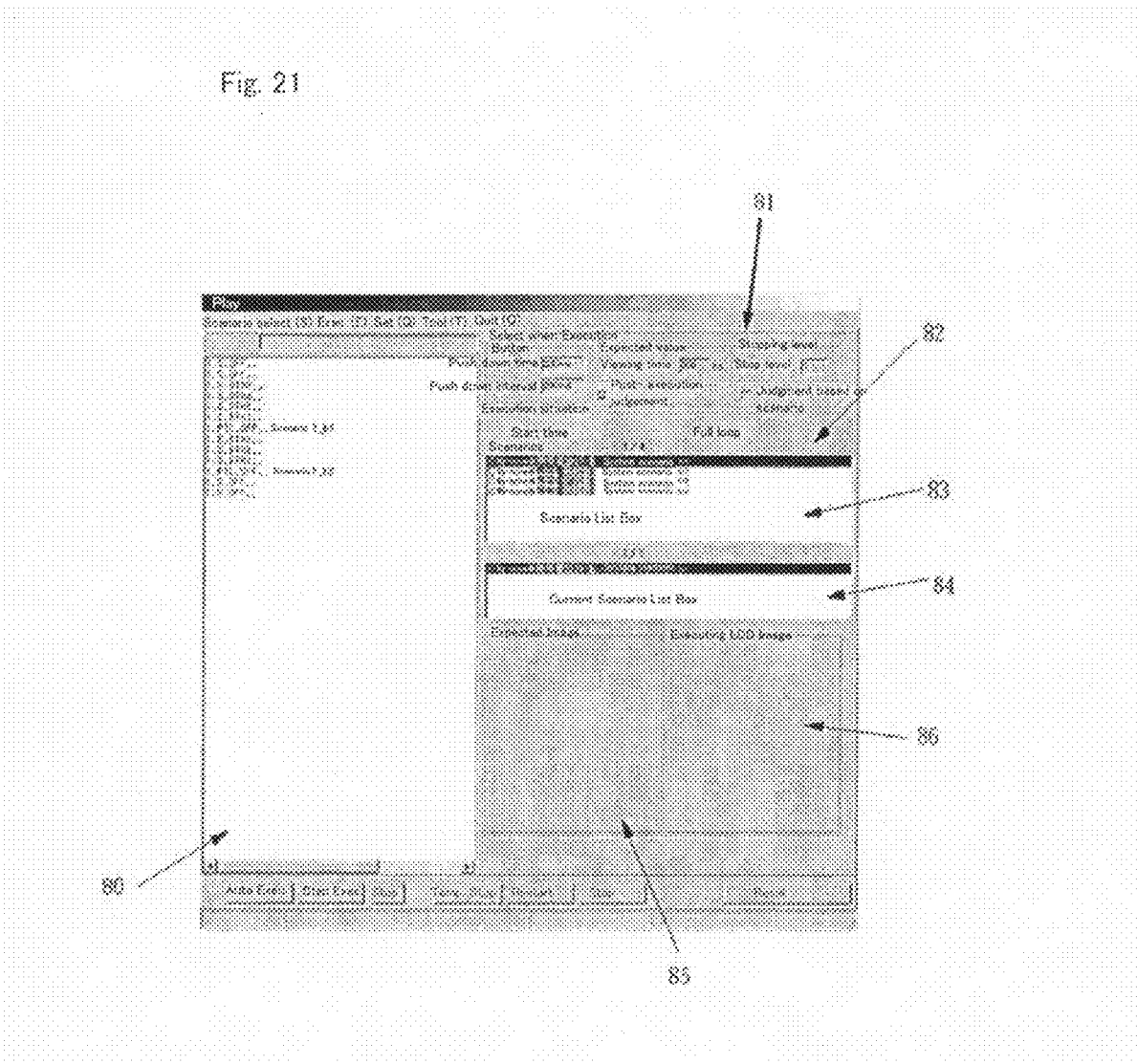
FIG. 21 shows an execution screen.
Figure 22:
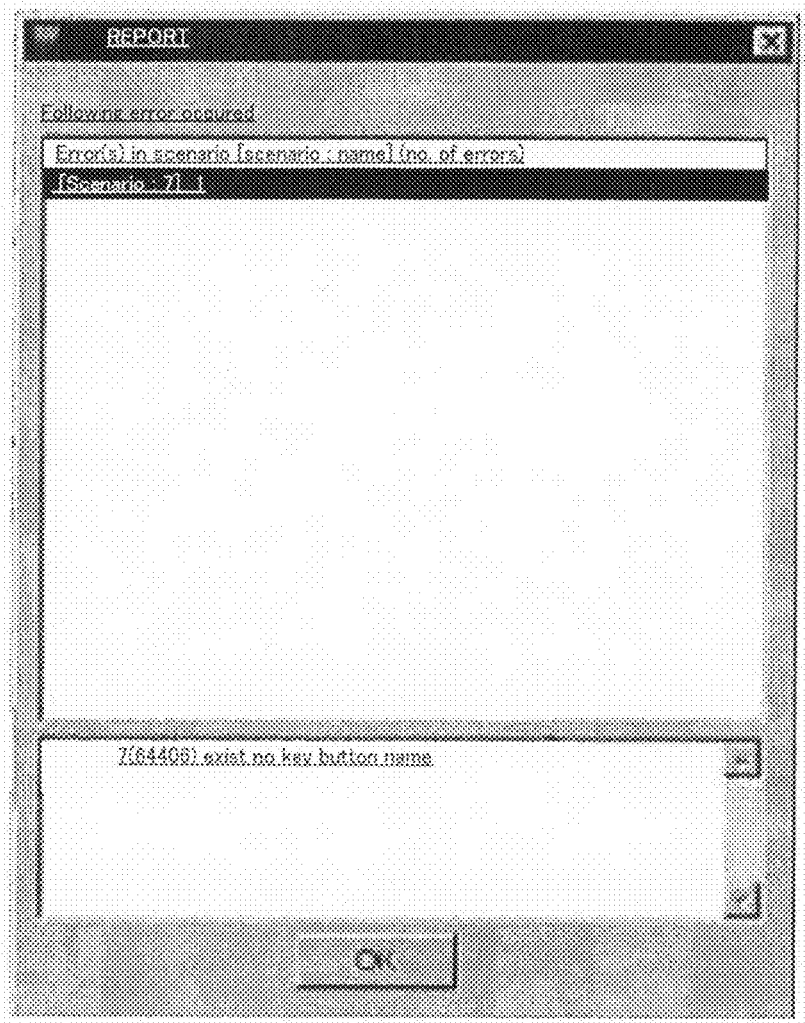
FIG. 22 shows an error report.
Figure 23:
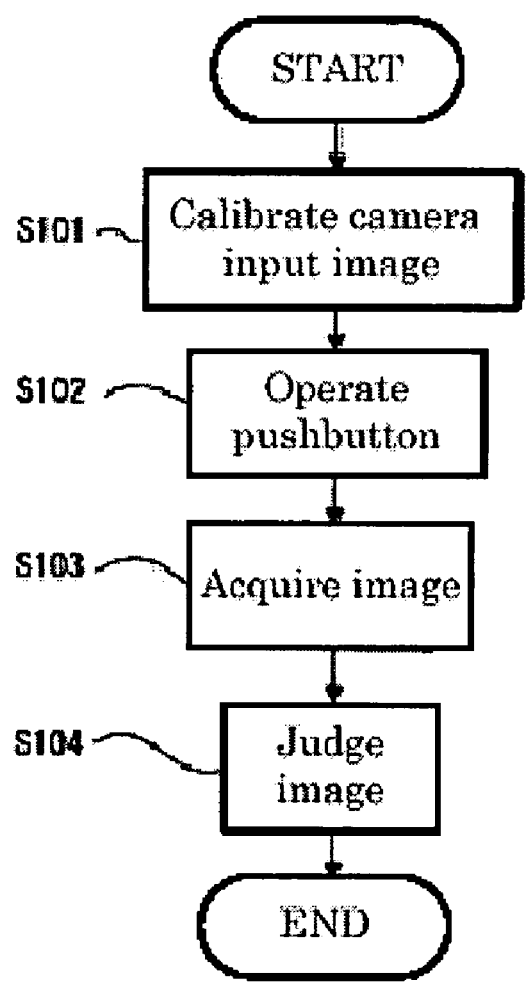
FIG. 23 is a flowchart illustrating an image judgment process operation that is performed by a cellular phone inspection apparatus according to one embodiment of the present invention.
Figure 24:
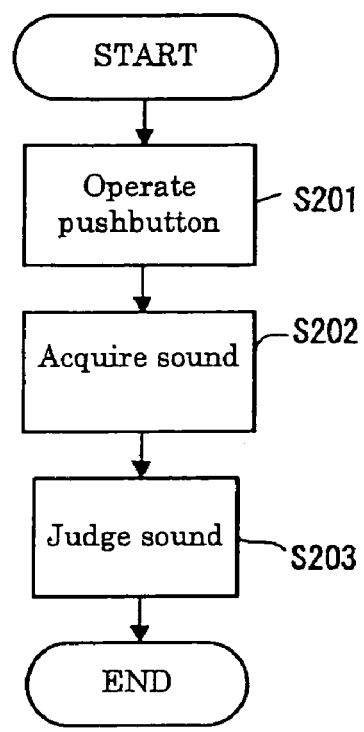
FIG. 24 is a flowchart illustrating a sound judgment process operation that is performed by a cellular phone inspection apparatus according to one embodiment of the present invention.
Figure 25:
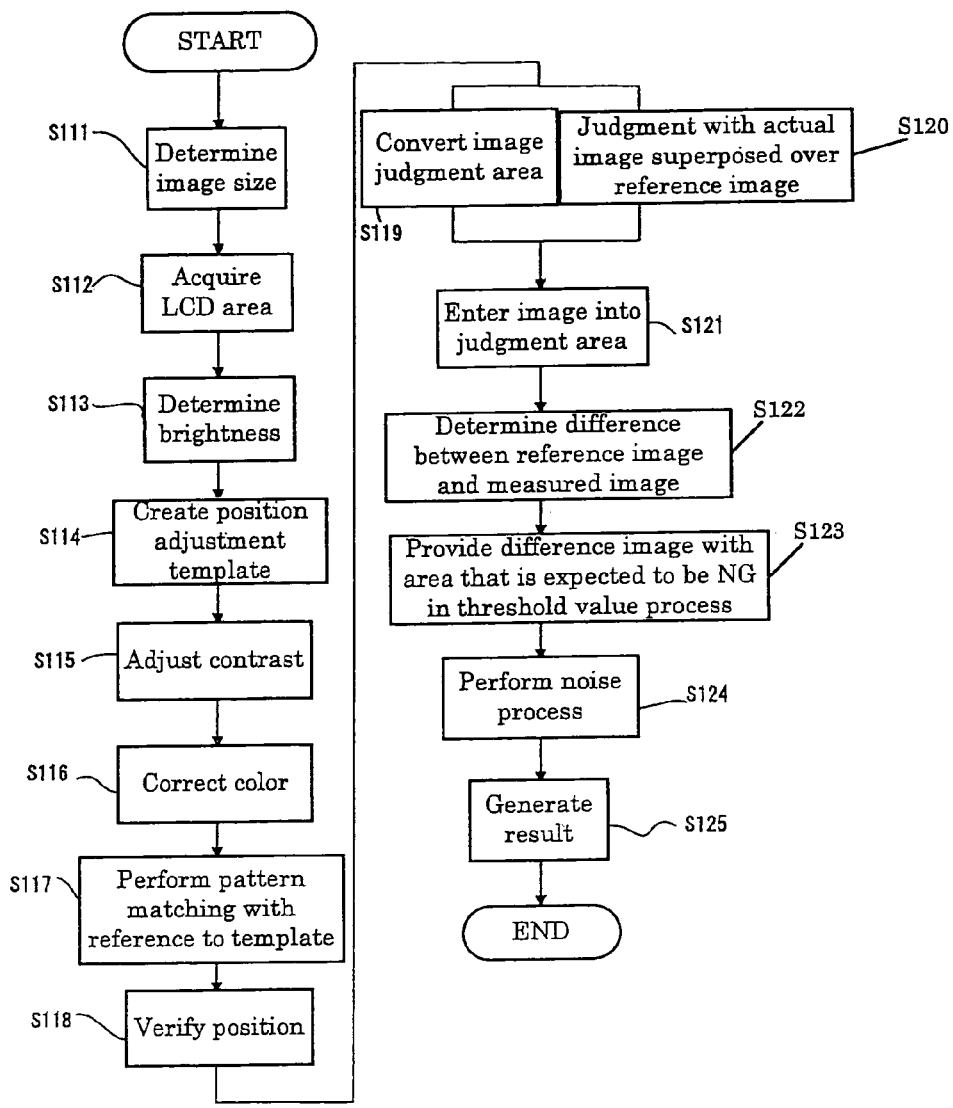
FIG. 25 is a flowchart illustrating a still picture judgment process operation that is performed by a cellular phone inspection apparatus according to one embodiment of the present invention.
Figure 26A:
FIGS. 26(a) to 26(e) show a typical still picture judgment process operation that is performed by a cellular phone inspection apparatus according to one embodiment of the present invention.
Figure 26B:
Figure 26C:
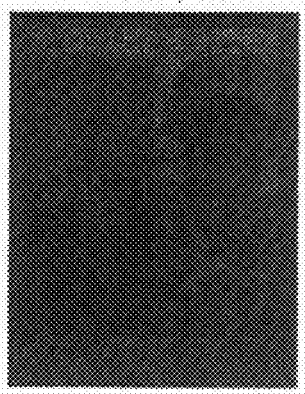
Figure 26D:
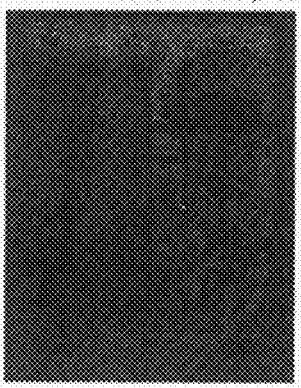
Figure 26E:
Figure 27:
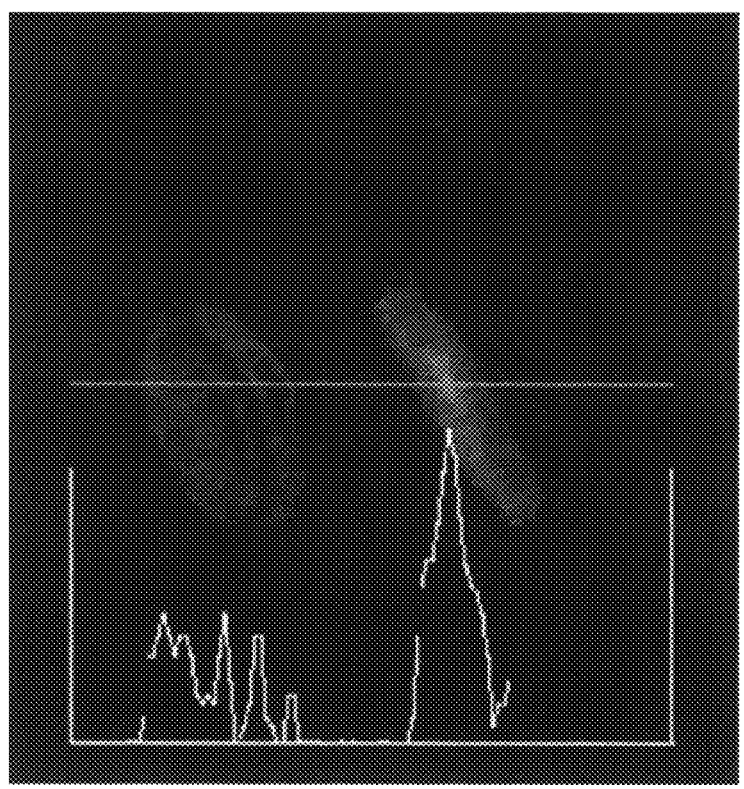
FIG. 27 shows an area designation process that a cellular phone inspection apparatus according to one embodiment of the present invention performs as a part of a still picture judgment process operation.
Figure 28:
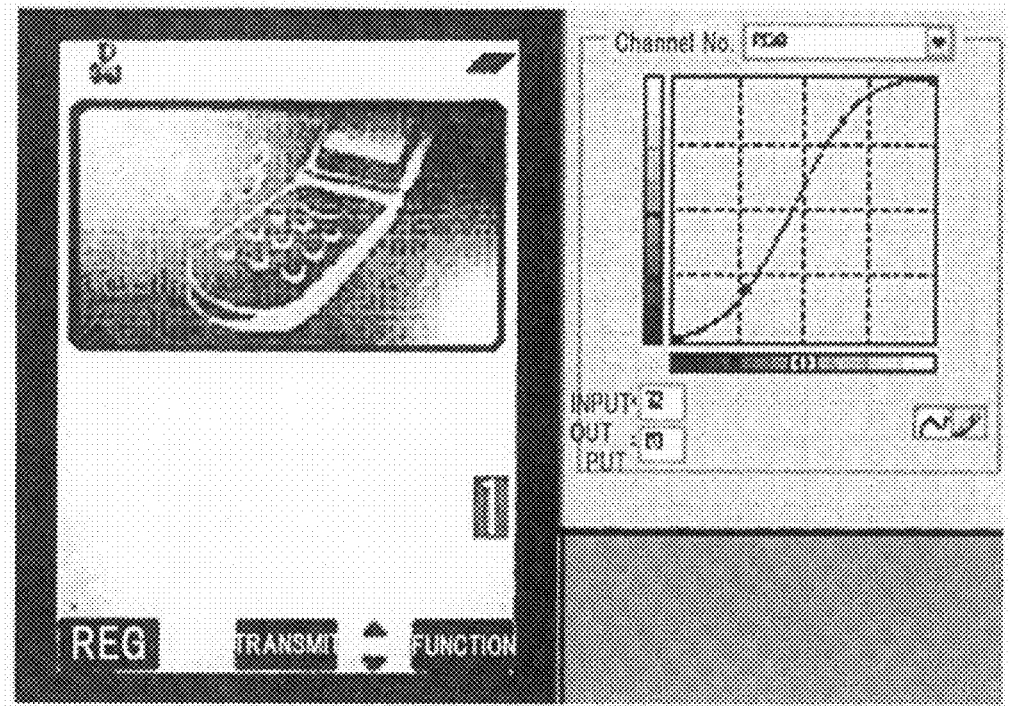
FIG. 28 shows a brightness correction process that a cellular phone inspection apparatus according to one embodiment of the present invention performs as a part of a still picture judgment process operation.
Figure 29A:
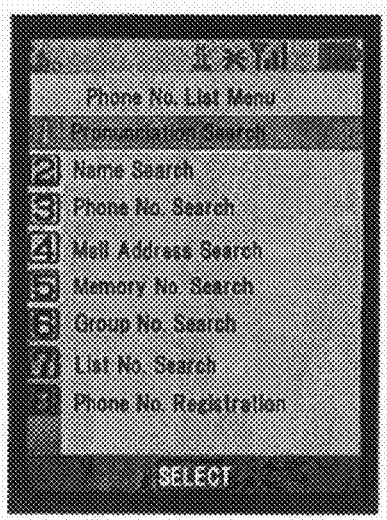
Figure 29B:
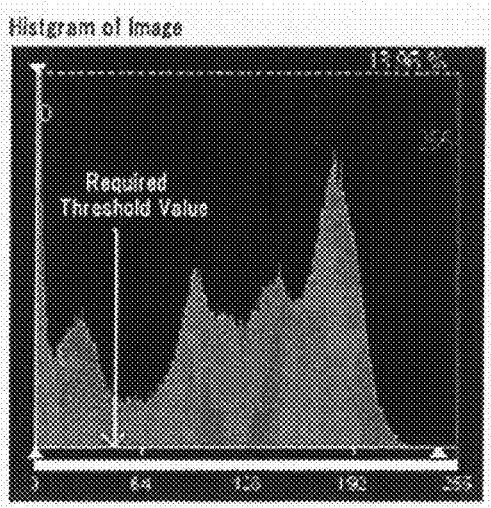
Figure 30:
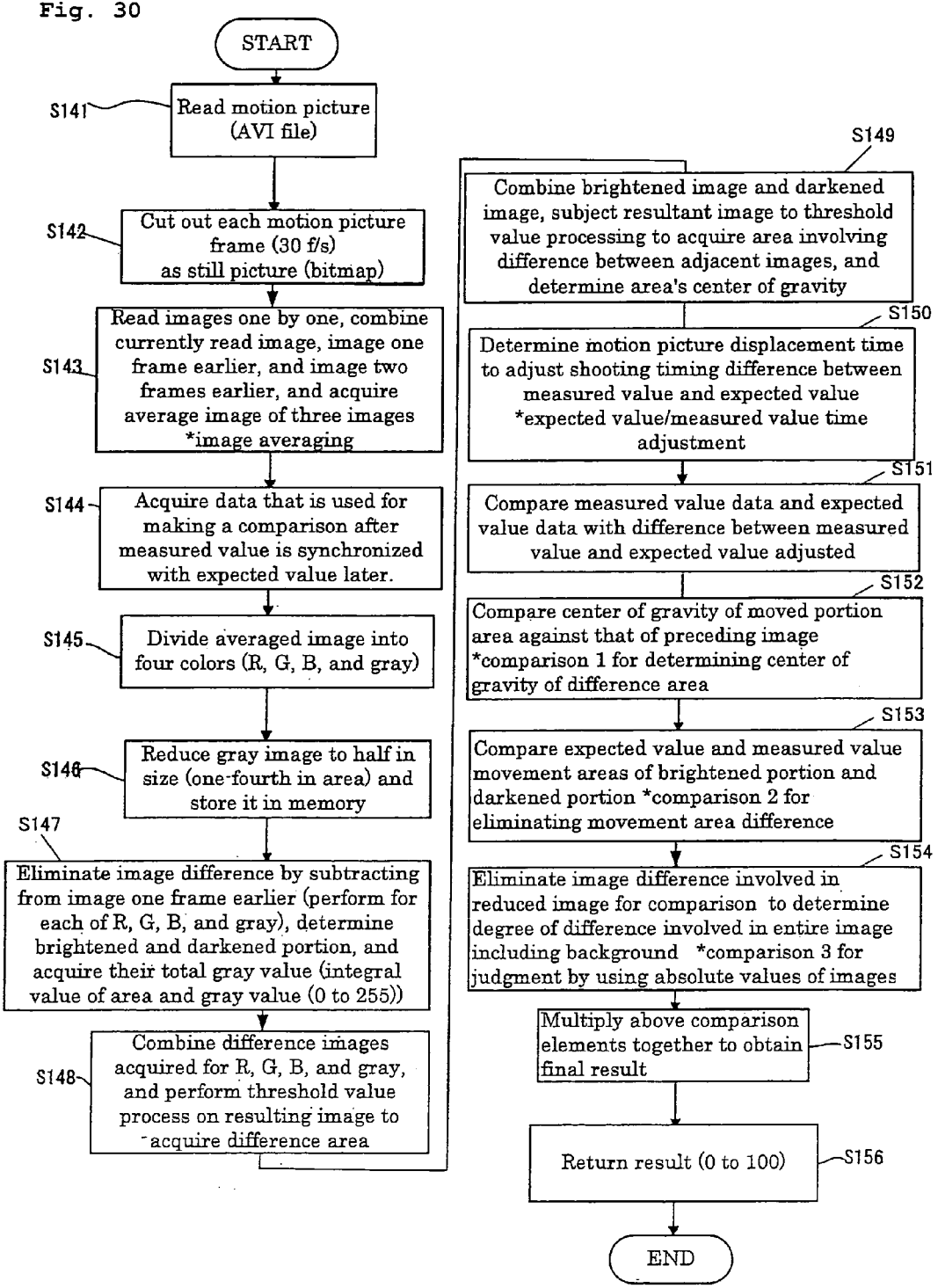
FIG. 30 is a flowchart illustrating a motion picture judgment process operation that is performed by a cellular phone inspection apparatus according to one embodiment of the present invention.
Figure 31A:
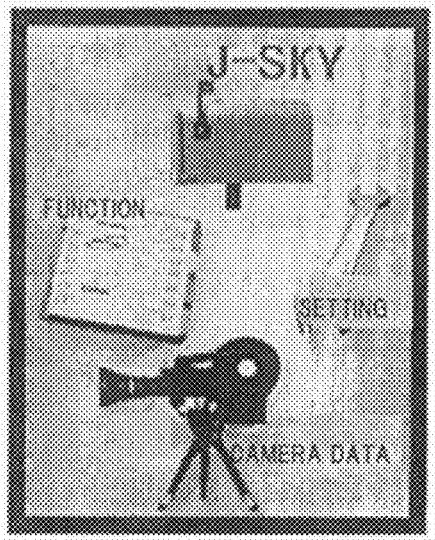
FIGS. 31(a) to 31(d) show a typical motion picture judgment process operation that is performed by a cellular phone inspection apparatus according to one embodiment of the present invention.
Figure 31B:
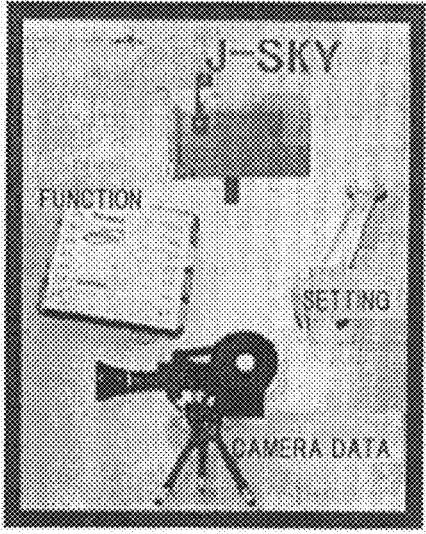
Figure 31C:
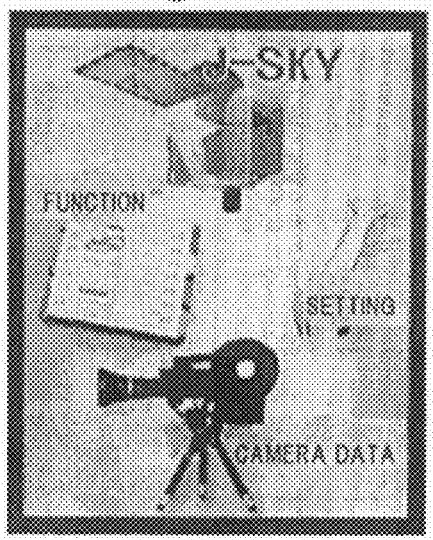
Figure 31D:
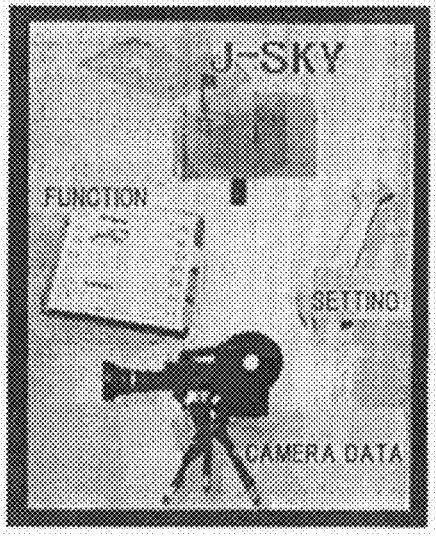
Figure 32A:
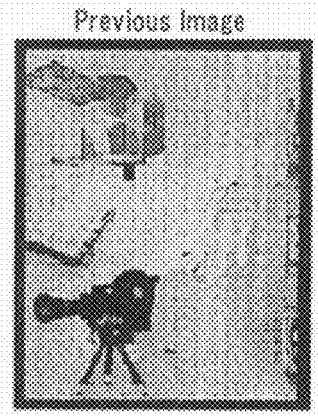
FIGS. 32(a) to 32(c) show a typical motion picture judgment process operation that is performed by a cellular phone inspection apparatus according to one embodiment of the present invention.
Figure 32B:
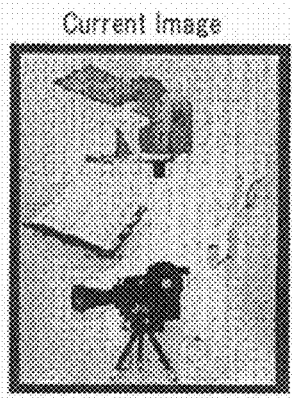
Figure 32C:
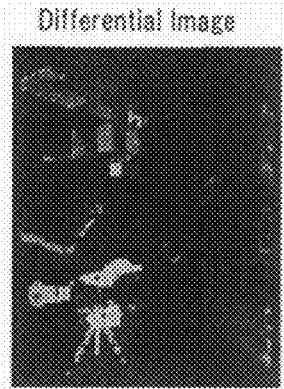
Figure 33A:
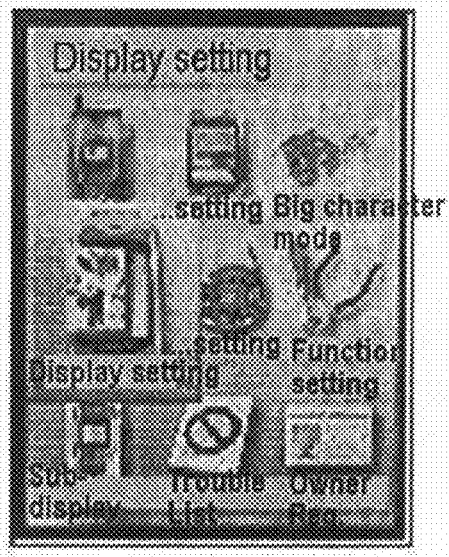
FIGS. 33(a) and 33(b) show a typical motion picture judgment process operation that is performed by a cellular phone inspection apparatus according to one embodiment of the present invention.
Figure 33B:
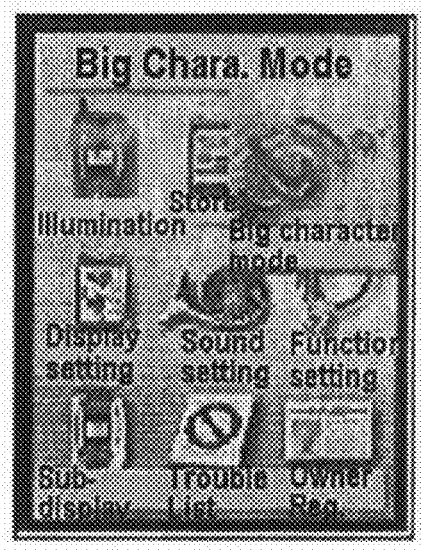
Figure 34A:
FIGS. 34(a) and 34(b) show a typical motion picture judgment process operation that is performed by a cellular phone inspection apparatus according to one embodiment of the present invention.
Figure 34B:
Figure 35A:
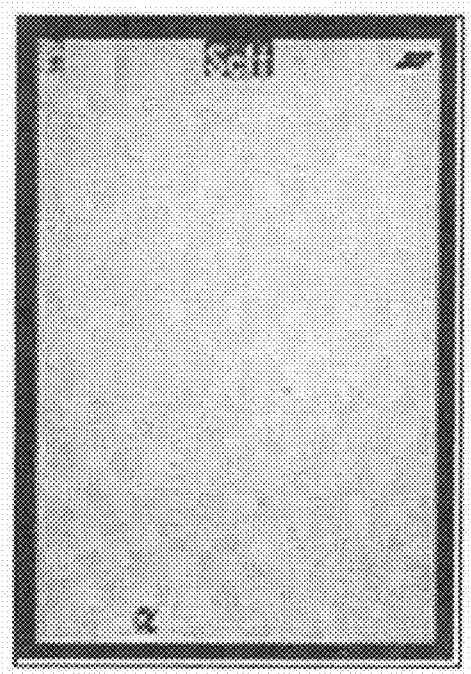
FIGS. 35(a) and 35(b) show a typical motion picture judgment process operation that is performed by a cellular phone inspection apparatus according to one embodiment of the present invention.
Figure 35B:
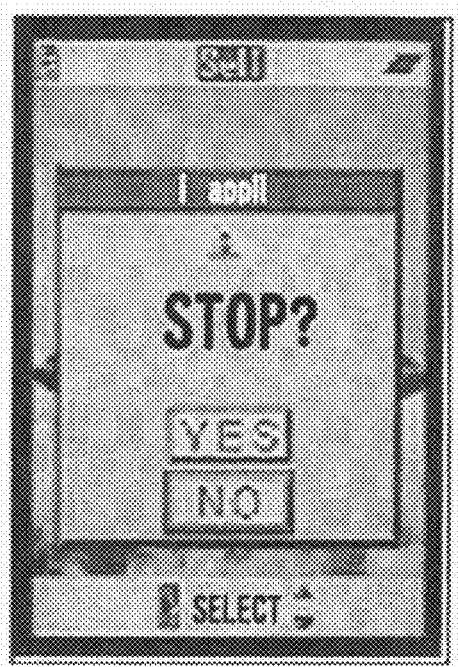
Figure 36:
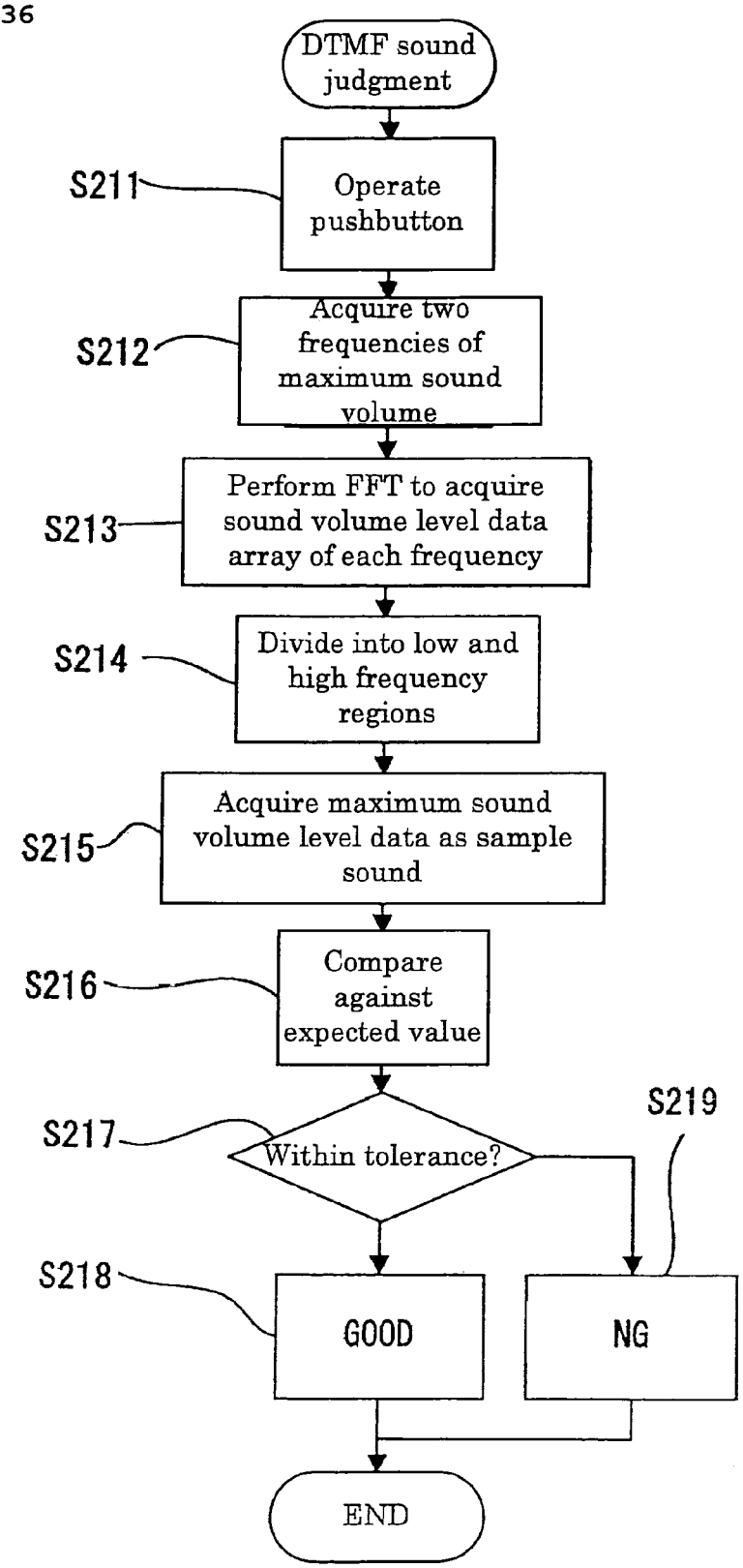
FIG. 36 is a flowchart illustrating a DTMF sound judgment process operation that is performed by a cellular phone inspection apparatus according to one embodiment of the present invention.
Figure 37:
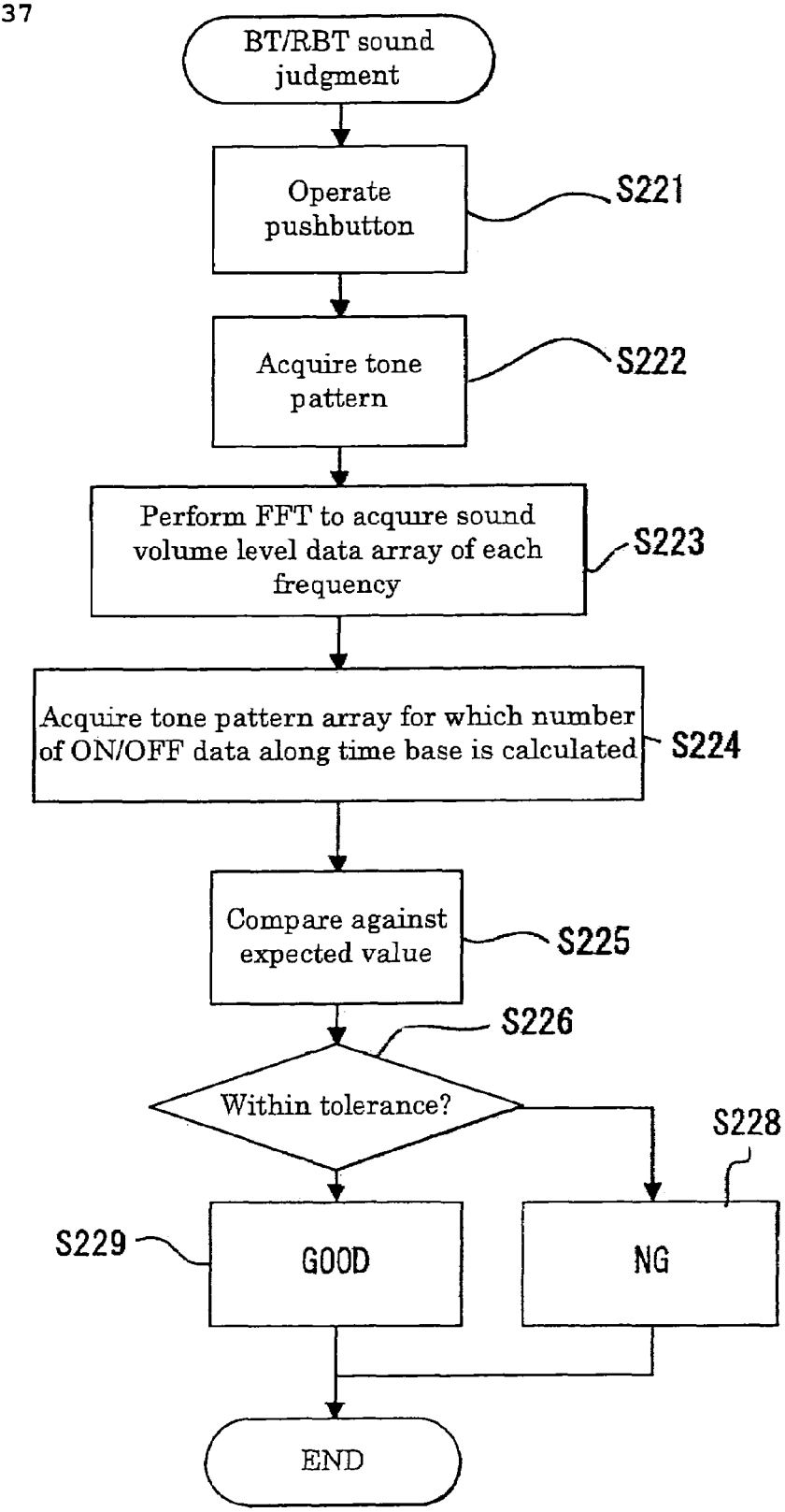
FIG. 37 is a flowchart illustrating a BT/RBT sound judgment process operation that is performed by a cellular phone inspection apparatus according to one embodiment of the present invention.
Figure 38:
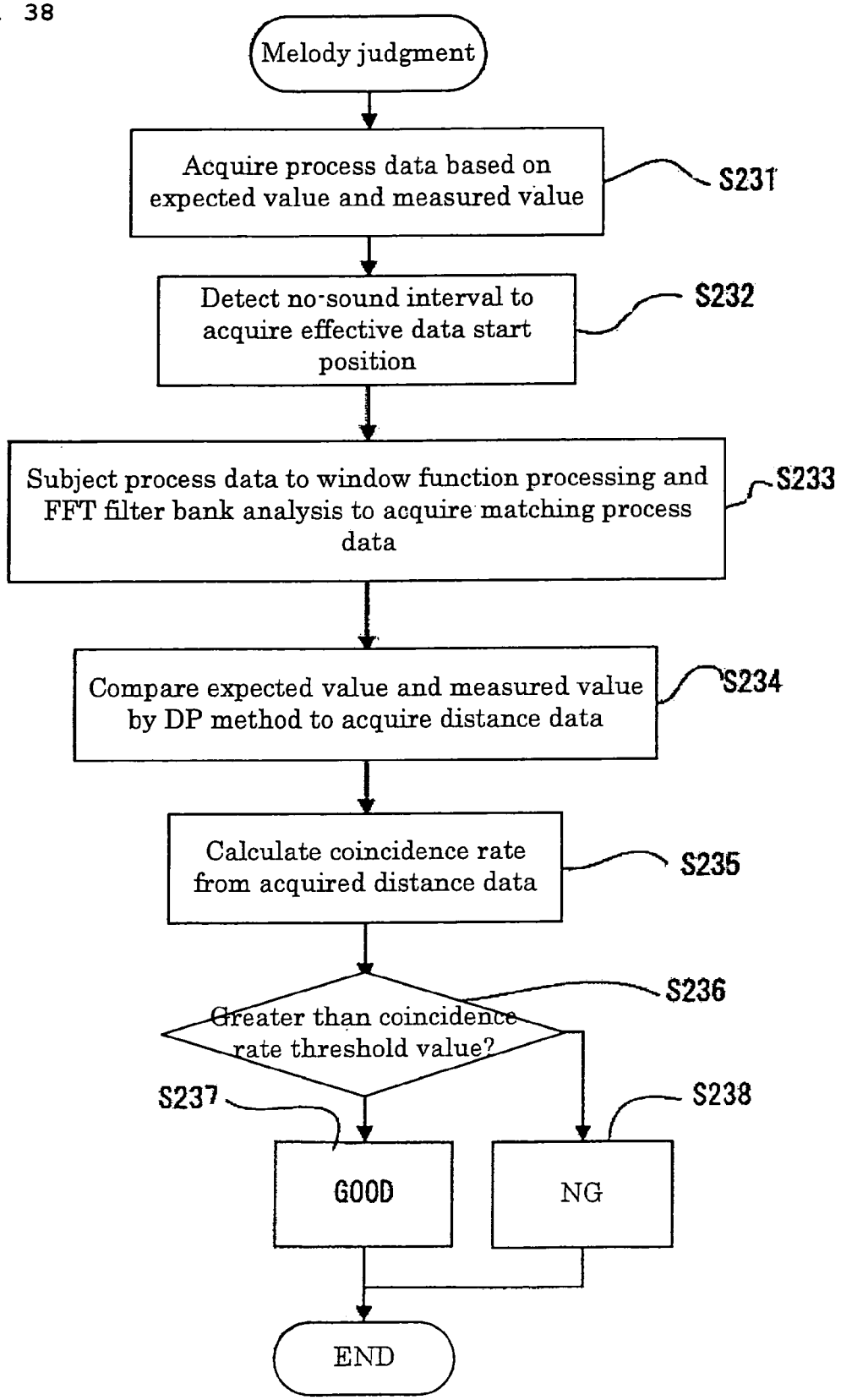
FIG. 38 is a flowchart illustrating a melody judgment process operation that is performed by a cellular phone inspection apparatus according to one embodiment of the present invention.
Figure 39:
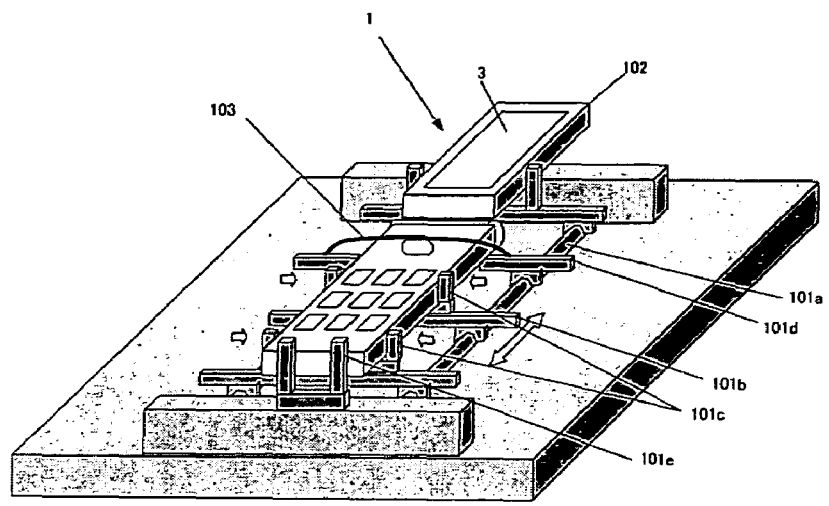
FIG. 39 is a perspective view that conceptually illustrates one embodiment of a cellular phone retainer according to the present invention.
Figure 40:
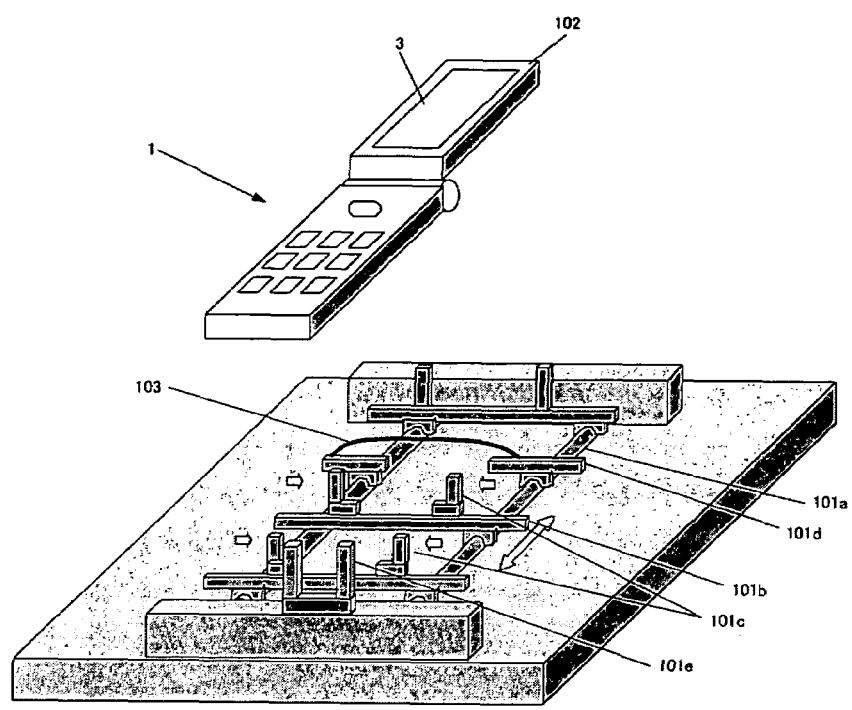
FIG. 40 is a perspective view that conceptually illustrates one embodiment of a cellular phone retainer according to the present invention.
Figure 41:
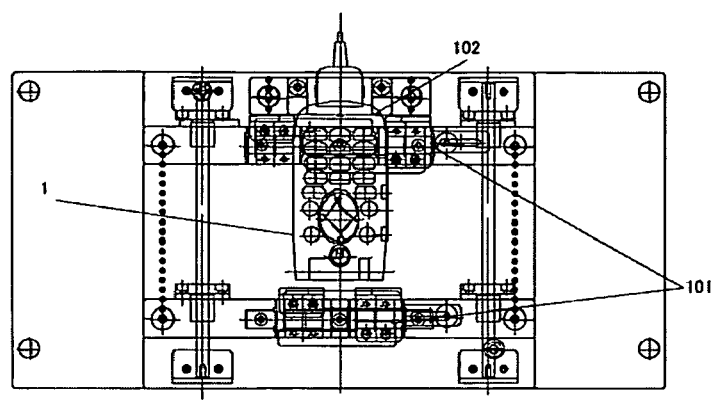
FIG. 41 is a plan view that illustrates in detail the state indicated in FIG. 39.
Figure 42:
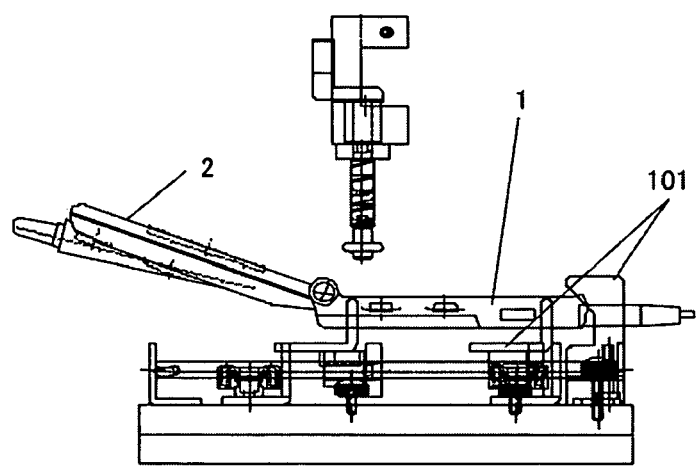
FIG. 42 is a side view that illustrates in detail the state indicated in FIG. 39.
Figure 43:
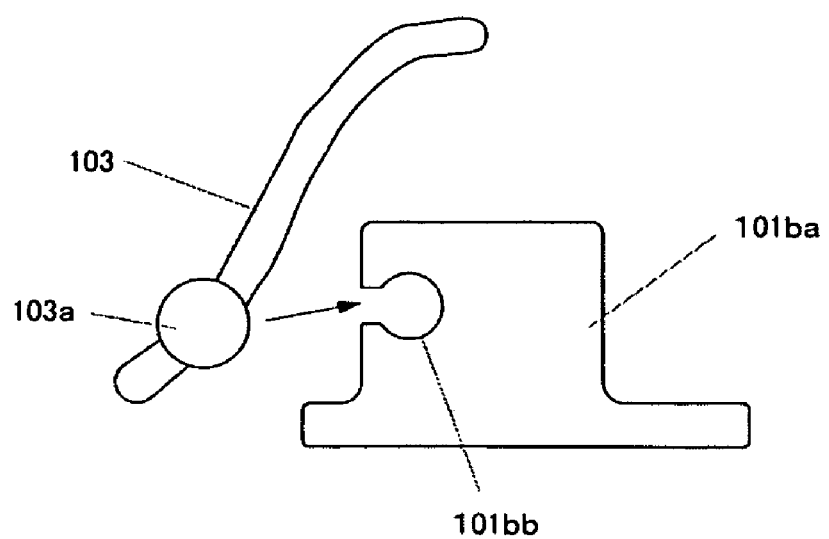
FIG. 43 is a cross-sectional view that illustrates how an elastic member is mounted on a child slider.

1: Cellular phone
1a: Cellular phone overall plan view
2: Adapter unit
3: LCD panel
3a: LCD panel image
4: Camera
5: Operating control button (key button)
6: Release
7: Plunger unit
8: Computer
9: Monitor
11: Display section
12: Operating control section
21: Adapter unit base plate
22: Inclined plate
23: Release guide panel
24: Side plate
25: Hole
26: Speaker
30: Base unit
31: Base unit base plate
32: Microphone
33: Tower section
35: Microphone
40: Calibration sheet
50: Scenario list box
51: Command setup tab
52: Information setup section
53: Expected value image display space
61: Release tube
62: Pin
63: Metal pipe section
64: Screw thread
65: Lock screw
66: Adjustment screw
80: Sceanrio list box
81: Execution time designation section
82: Execution status display section
83: Scenario table list box
84: Current scenario box
85: Expected value image display section
86: Execution LCD image display sectoion
101: Support member
101a: Guide support member
101b: Parent slider
101ba: Part constituting a child slider
101bb: Hole
101c: Child slider
101d: Retention support member
101e: Support member
102: Cellular phone cover
103: Elastic member
103a: Spherical or like member for an elastic member

The invention claimed is:

1. A device inspection apparatus for inspecting the operation of an inspection target device that includes an operating control section, which has a plurality of operating control buttons, and a display section whose on-screen contents vary in accordance with the operation of at least one of the operating control buttons, the device inspection apparatus comprising:

image pickup means for picking up an image of said display section;

an adapter for placing the inspection target device in a predetermined state in relation to the image pick means and rendering the inspection target device replaceable;

button control means including a plurality of press means that are capable of pressing one of said operating control buttons;

control means for selecting the button control means and exercising operating control; and display means for displaying an image acquired by said image pickup means and an image based on a signal supply from said control means;

wherein said control means includes means for displaying a previously obtained overall image of said inspection target device on said display means, button assignment means for defining the relationship between operating control button images within said overall image displayed by the display means and a plurality of press means of said button control means, means for displaying an image of said display section, which is obtained by said image pickup means, at a display section position of the displayed overall image, and scenario setup means for specifying a procedure for operating said press means, and can check for agreement between the contents displayed on a display of said inspection target device and an image displayed on said display section by operating said press means according to the procedure specified by said scenario setup means to selectively operate said plurality of press means.

2. The device inspection apparatus according to claim 1, wherein said adapter incorporates a microphone for collecting a sound that is emitted by said inspection target device.

3. The device inspection apparatus according to claim 1, wherein said adapter incorporates a speaker for generating an amplified output of a sound that is emitted by said inspection target device.

4. The device inspection apparatus according to claim 1, wherein said adapter covers at least an upper surface of said operating control section of said inspection target device and includes a guide plate, which has at least the same number of guide holes as the number of required operating control buttons to position said press means in alignment with said required operating control buttons.

5. The device inspection apparatus according to claim 1 wherein said inspection target device is a folding type, open/close device that includes said display section and said operating control section, which are hinged together, and an operating control button for opening; and wherein said button control means includes press means for operating the operating control button for opening.

6. The device inspection apparatus according to claim 1 further comprising image judgment means for comparing an image displayed on the display of the inspection target device, which is picked up by said image pickup means, against an image displayed on said display section, and generating information for indicating the agreement between the compared images.

7. The device inspection apparatus according to claim 6, wherein said image judgment means judges either still pictures or motion pictures.

8. The device inspection apparatus according to claim 6, wherein said image judgment means is provided with a process for calibrating said image pickup means.

9. The device inspection apparatus according to claim 6, wherein said image judgment means compares a shot image against a reference image, extracts an area representing a difference between the compared images, and judges a display error location.

10. The device inspection apparatus according to claim 9, wherein said image judgment means corrects a judgment target image by enhancing the contrast of the judgment target image and handles the corrected image as the judgment target image.

11. The device inspection apparatus according to claim 8, wherein an image acquisition frame is set as a judgment target.

12. The device inspection apparatus according to claim 8, wherein said image judgment means extracts a highly bright portion of a judgment target and handles the extracted portion as the judgment target.

13. The device inspection apparatus according to claim 8, wherein said image judgment means extracts a difference as a brightness difference and judges an error location in accordance with the magnitude of the difference and the size of the difference.

14. The device inspection apparatus according to claim 8, wherein said image judgment means stores a motion picture acquired by the image pickup means in storage means as a plurality of still pictures and compares the stored images against an expected value, which serves as a judgment criterion, with timing adjusted.

15. The device inspection apparatus according to claim 8, wherein said image judgment means selects a particular still picture from a plurality of acquired still pictures, determines an average value of the selected still picture and a still picture close to the selected still picture in time, and handles the average value as a judgment target image.

16. The device inspection apparatus according to claim 8, wherein said image judgment means performs a process for creating a plurality of color-specific image data, which are obtained by separating a judgment target image into various colors, and gray data including brightness data only, determining difference values within the color-specific image data, creating an overall gray value from the difference values, extracting a great change in the overall gray value as a great-change area, and determining the center of gravity of the great-change area.

17. The device inspection apparatus according to claim 8, wherein said image judgment means creates an overall gray value from the difference values and extracts a great change in the overall gray value as a great-change area.

18. The device inspection apparatus according to claim 8, wherein said image judgment means performs a process for determining a movement area difference.

19. The device inspection apparatus according to claim 8, wherein a judgment is formulated in accordance with an image absolute value.

20. The device inspection apparatus according to claim 17, wherein a final judgment is formulated in accordance with a plurality of results.

21. The device inspection apparatus according to claim 1, further comprising sound judgment means, which compares a sound that is generated by a target device and acquired, by said microphone against a sound that should be generated by said target device, and outputs information indicating whether the two sounds agree with each other.

22. The device inspection apparatus according to claim 21, wherein said sound judgment means judges a DTMF sound.

23. The device inspection apparatus according to claim 21, wherein said sound judgment means judges an RT/RBT sound.

24. The device inspection apparatus according to claim 22, wherein said sound judgment means formulates a judgment by measuring the frequency of a microphone-input sound having a high level.

25. The device inspection apparatus according to claim 22, wherein said sound judgment means makes a frequency analysis and formulates a judgment in accordance with the result of the frequency analysis.

* * * * *